(12) United States Patent
Jia et al.

(10) Patent No.: US 12,199,925 B2
(45) Date of Patent: *Jan. 14, 2025

(54) DATA TRANSMISSION METHOD, NETWORK DEVICE, AND TERMINAL DEVICE

(71) Applicant: HUAWEI TECHNOLOGIES CO., LTD., Shenzhen (CN)

(72) Inventors: Qiong Jia, Shanghai (CN); Jun Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,358

(22) Filed: Mar. 21, 2023

(65) Prior Publication Data

US 2023/0327842 A1 Oct. 12, 2023

Related U.S. Application Data

(63) Continuation of application No. 16/797,031, filed on Feb. 21, 2020, now Pat. No. 11,626,964, which is a (Continued)

(30) Foreign Application Priority Data

Aug. 25, 2017 (CN) .......................... 201710743358.7

(51) Int. Cl.
H04W 72/0446 (2023.01)
H04L 5/00 (2006.01)
(Continued)

(52) U.S. Cl.
CPC .......... *H04L 5/0094* (2013.01); *H04L 5/0044* (2013.01); *H04W 72/044* (2013.01); *H04W 72/23* (2023.01); *H04L 27/2602* (2013.01)

(58) Field of Classification Search
CPC ..... H04L 5/001; H04L 5/0094; H04L 5/0044; H04W 72/044; H04W 72/23; H40L 27/2602

See application file for complete search history.

(56) References Cited

U.S. PATENT DOCUMENTS 11,626,964 B2 * 4/2023 Jia .......................... H04W 72/23
370/330
2012/0263131 A1 10/2012 Ogawa
(Continued)

FOREIGN PATENT DOCUMENTS

CN 102858014 A 1/2013
CN 103688480 A 3/2014
(Continued)

OTHER PUBLICATIONS

Fujitsu, "Discussion on frequency domain resource allocation," 3GPP TSG RAN WG1 Meeting #90, R1-1712741 Prague, Czech Republic, Aug. 21, 2017, Agenda Item: 6.1.3.3.1.1, pp. 1-4.
(Continued)

Primary Examiner — Maharishi V Khirodhar
(74) Attorney, Agent, or Firm — Rimon PC

(57) ABSTRACT

Embodiments of this application provide a data transmission method, a network device, and a terminal device. The method includes: A network device sends resource indication information to a terminal device, so that the terminal device determines, based on the resource indication information, a resource allocated by the network device. The resource indication information is used to indicate location information of a resource in at least one BWP in a system bandwidth and bandwidth information of the at least one BWP. Further, the network device receives, on a resource corresponding to the resource indication information, uplink data sent by the terminal device. It can be learned that, in the embodiments, the network device may indicate a system (Continued)

bandwidth of any size and/or a resource in any BWP in the system bandwidth to the terminal device, so that the terminal device can perform data transmission on the indicated resource.

8 Claims, 11 Drawing Sheets

Related U.S. Application Data continuation of application No. PCT/CN2018/100050, filed on Aug. 10, 2018.

(51) Int. Cl.
*H04W 72/044* (2023.01)
*H04W 72/0453* (2023.01)
*H04W 72/23* (2023.01)
*H04W 88/08* (2009.01)
*H04L 27/26* (2006.01)

(56) References Cited

U.S. PATENT DOCUMENTS

| | | |
|---|---|---|
| 2014/0146799 A1 | 5/2014 | Park et al. |
| 2014/0153539 A1 | 6/2014 | Seo et al. |
| 2015/0208387 A1 | 7/2015 | Awad et al. |
| 2015/0341097 A1 | 11/2015 | Yang et al. |
| 2016/0264969 A1 | 9/2016 | Patel et al. |
| 2017/0273056 A1 | 9/2017 | Papasakellariou |
| 2018/0220404 A1 | 8/2018 | Awad |
| 2018/0220422 A1 | 8/2018 | Bhattad |
| 2020/0235894 A1 | 7/2020 | Takeda |

FOREIGN PATENT DOCUMENTS

| | | |
|---|---|---|
| CN | 103733586 A | 4/2014 |
| CN | 103959682 A | 7/2014 |
| CN | 102036387 B | 4/2015 |
| CN | 106961731 A | 7/2017 |
| CN | 107078870 A | 8/2017 |
| EP | 3654599 A1 | 5/2020 |

OTHER PUBLICATIONS

Huawei, et al., "Coexistence of different UE types on a wideband carrier," 3GPP TSG RAN WG1 Meeting #90, R1-1713733, Prague, Czech Republic, Aug. 21, 2017, Agenda Item: 6.1.3.3.9, pp. 1-6.

Qualcomm Incorporated: "Resource allocation for larger datachannel bandwidth", 3GPP Draft; R1-1702538, Feb. 12, 2017, XP051209692,total 10 pages.

Ericsson: "Resource allocation for for larger channel bandwidth for FeMTC", 3GPP Draft; R1-1701984, Feb. 12, 2017, XP051209146, total 10 pages.

LG Electronics: "PUSCH resource allocation in LAA", 3GPP Draft; R1-164495,May 14, 2016(May 14, 2016), XP051096426,total 6 pages.

Wordnik, "Uplink—definition and meaning" Mar. 12, 2012; https://www.wordnik.com/words/uplink (year: 2012).

\* cited by examiner

DATA TRANSMISSION METHOD, NETWORK DEVICE, AND TERMINAL DEVICE

CROSS-REFERENCE TO RELATED APPLICATIONS

This application is a continuation of U.S. patent application Ser. No. 16/797,031, filed on Feb. 21, 2020, which is a continuation of International Application No. PCT/CN2018/100050, filed on Aug. 10, 2018. The International Application claims priority to Chinese Patent Application No. 201710743358.7, filed on Aug. 25, 2017. All of the aforementioned patent applications are hereby incorporated by reference in their entireties.

TECHNICAL FIELD

This application relates to communications technologies, and in particular, to a data transmission method, a network device, and a terminal device.

BACKGROUND

Development of wireless communications technologies puts a strain on spectrum resources. Therefore, researches on a design of a data transmission solution to improve spectrum resource utilization are facilitated.

In an existing long term evolution (Long Term Evolution, LTE) system and an evolved LTE system thereof, a network device sends location information (used to indicate a location of a resource allocated by a network device to the terminal device in a system bandwidth) to the terminal device. Further, the terminal device may learn of, based on the location information, the location of the resource allocated by the network device to the terminal device, and then perform data transmission on a corresponding resource. However, the system bandwidth in the LTE system is fixed. In other words, a prior-art data transmission solution is applicable only to data transmission on a system bandwidth of a fixed size.

However, with development of communications systems and/or bandwidth technologies, a communications device in a new radio (New Radio, NR) system needs to perform data transmission in a scenario with a larger system bandwidth and a variable system bandwidth. Therefore, how to indicate a resource required for data transmission to the terminal device in the scenario with a larger system bandwidth and a variable system bandwidth becomes a technical problem to be urgently resolved currently.

SUMMARY

Embodiments of this application provide a data transmission method, a network device, and a terminal device, so that the network device indicates a resource required for data transmission to the terminal device in a scenario with a larger system bandwidth and a variable system bandwidth, and the terminal device can perform data transmission on the indicated resource.

According to a first aspect, an embodiment of this application provides a data transmission method, including:
sending, by a network device, resource indication information to a terminal device, where the resource indication information is used to indicate location information of a resource in at least one bandwidth subset BWP in a system bandwidth and bandwidth information of the at least one BWP; and
receiving, by the network device on a resource corresponding to the resource indication information, uplink data sent by the terminal device.

According to the data transmission method provided in the first aspect, the network device sends the resource indication information to the terminal device, so that the terminal device determines, based on the resource indication information, a resource allocated by the network device to the terminal device. The resource indication information is used to indicate the location information of the resource in the at least one BWP in the system bandwidth and the bandwidth information of the at least one BWP. Further, the network device receives, on the resource corresponding to the resource indication information, the uplink data sent by the terminal device. It can be learned that, in this embodiment, the resource indication information sent by the network device to the terminal device is used to indicate both the location information of the resource that is in the at least one BWP and that is allocated by the network device to the terminal device, and the bandwidth information of the at least one BWP, so that the terminal device can determine, based on the resource indication information, the resource allocated by the network device. Therefore, in this embodiment, the network device may indicate a system bandwidth of any size and/or a resource in any BWP in the system bandwidth to the terminal device, so that the terminal device can perform data transmission on the indicated resource. This implements flexible data transmission.

In a possible implementation, the sending, by a network device, resource indication information to a terminal device includes:
sending, by the network device to the terminal device in a preset sequence, resource indication information corresponding to each BWP in the system bandwidth, where the resource indication information corresponding to each BWP is used to indicate location information of a resource in the BWP, a sending sequence of the resource indication information corresponding to each BWP corresponds to location information of the BWP in the system bandwidth, and the bandwidth information of the at least one BWP includes location information of the at least one BWP in the system bandwidth.

In a possible implementation, the resource indication information corresponding to each BWP includes a third RIV corresponding to the BWP, and the third RIV corresponding to the BWP is determined by the network device based on a relative start resource block RB index, of the resource in the BWP, in the BWP and a quantity of interlaced resource block groups IRGs included in the resource in the BWP.

In a possible implementation, if the network device does not allocate a resource to the terminal device in any BWP in the system bandwidth, resource indication information corresponding to the any BWP is preset resource indication information. The preset resource indication information is used to indicate that the resource allocated by the network device to the terminal device in the any BWP is empty.

In this embodiment of this application, the network device sends, to the terminal device in the preset sequence, the resource indication information corresponding to each BWP in the system bandwidth (the resource indication information corresponding to each BWP is used to indicate location information of a resource in the BWP, and a sending sequence of the resource indication information corresponding to each BWP corresponds to location information of the BWP in the system bandwidth), so that the terminal device determines, based on the resource indication information corresponding to each BWP and a receiving sequence of the resource indication information corresponding to each BWP, a resource corresponding to the resource indication information corresponding to each BWP. It can be learned that, in this embodiment, the resource indication information that is sent by the network device to the terminal device and that corresponds to each BWP is used to indicate both the location information of the resource in the BWP and bandwidth information of the BWP, so that the terminal device can determine, based on the resource indication information corresponding to each BWP, the resource allocated by the network device. Therefore, in this embodiment, the network device may indicate a system bandwidth of any size and/or a resource in any BWP in the system bandwidth to the terminal device, so that the terminal device can perform data transmission on the indicated resource. This implements flexible data transmission.

According to a second aspect, an embodiment of this application provides a data transmission method, including:
receiving, by a terminal device, resource indication information sent by a network device, where the resource indication information is used to indicate location information of a resource in at least one bandwidth subset BWP in a system bandwidth and bandwidth information of the at least one BWP; and
sending, by the terminal device, uplink data to the network device on a resource corresponding to the resource indication information, where the resource is determined by the terminal device based on the resource indication information.

According to the data transmission method provided in the second aspect, the terminal device receives the resource indication information sent by the network device. The resource indication information is used to indicate the location information of the resource in the at least one BWP in the system bandwidth and the bandwidth information of the at least one BWP. Further, the terminal device sends the uplink data to the network device on the resource corresponding to the resource indication information. The resource is determined by the terminal device based on the resource indication information. It can be learned that, in this embodiment, the resource indication information sent by the network device to the terminal device is used to indicate both the location information of the resource that is in the at least one BWP and that is allocated by the network device to the terminal device, and the bandwidth information of the at least one BWP, so that the terminal device can determine, based on the resource indication information, the resource allocated by the network device. Therefore, in this embodiment, the network device may indicate a system bandwidth of any size and/or a resource in any BWP in the system bandwidth to the terminal device, so that the terminal device can perform data transmission on the indicated resource. This implements flexible data transmission.

In a possible implementation, the receiving, by a terminal device, resource indication information sent by a network device includes:
receiving, by the terminal device, resource indication information that is sent by the network device in a preset sequence and that corresponds to each BWP in the system bandwidth, where the resource indication information corresponding to each BWP is used to indicate location information of a resource in the BWP, a sending sequence of the resource indication information corresponding to each BWP corresponds to location information of the BWP in the system bandwidth, and the bandwidth information of the at least one BWP includes location information of the at least one BWP in the system bandwidth.

In a possible implementation, the resource indication information corresponding to each BWP includes a third RIV corresponding to the BWP, and the third RIV corresponding to the BWP is determined by the network device based on a relative start resource block RB index, of the resource in the BWP, in the BWP and a quantity of interlaced resource block groups IRGs included in the resource in the BWP.

In a possible implementation, if the network device does not allocate a resource to the terminal device in any BWP in the system bandwidth, resource indication information corresponding to the any BWP is preset resource indication information. The preset resource indication information is used to indicate that the resource allocated by the network device to the terminal device in the any BWP is empty.

For beneficial effects of the implementations of the second aspect, refer to the beneficial effects brought by the corresponding implementations of the first aspect. Details are not described herein again.

According to a third aspect, an embodiment of this application provides a network device, including:
a sending module, configured to send resource indication information to a terminal device, where the resource indication information is used to indicate location information of a resource in at least one bandwidth subset BWP in a system bandwidth and bandwidth information of the at least one BWP; and a receiving module, configured to receive, on a resource corresponding to the resource indication information, uplink data sent by the terminal device.

In a possible implementation, the sending module is specifically configured to:
send, to the terminal device in a preset sequence, resource indication information corresponding to each BWP in the system bandwidth, where the resource indication information corresponding to each BWP is used to indicate location information of a resource in the BWP, a sending sequence of the resource indication information corresponding to each BWP corresponds to location information of the BWP in the system bandwidth, and the bandwidth information of the at least one BWP includes location information of the at least one BWP in the system bandwidth.

In a possible implementation, the resource indication information corresponding to each BWP includes a third RIV corresponding to the BWP, and the third RIV corresponding to the BWP is determined by the network device based on a relative start resource block RB index, of the resource in the BWP, in the BWP and a quantity of interlaced resource block groups IRGs included in the resource in the BWP.

In a possible implementation, if the network device does not allocate a resource to the terminal device in any BWP in the system bandwidth, resource indication information corresponding to the any BWP is preset resource indication information. The preset resource indication information is used to indicate that the resource allocated by the network device to the terminal device in the any BWP is empty.

For beneficial effects of the network device provided in the implementations of the third aspect, refer to beneficial effects brought by the implementations of the first aspect. Details are not described herein again.

According to a fourth aspect, an embodiment of this application provides a network device, including a transmitter and a receiver.

The transmitter is configured to send resource indication information to a terminal device. The resource indication information is used to indicate location information of a resource in at least one bandwidth subset BWP in a system bandwidth and bandwidth information of the at least one BWP.

The receiver is configured to receive, on a resource corresponding to the resource indication information, uplink data sent by the terminal device.

In a possible implementation, the transmitter is specifically configured to:

send, to the terminal device in a preset sequence, resource indication information corresponding to each BWP in the system bandwidth, where the resource indication information corresponding to each BWP is used to indicate location information of a resource in the BWP, a sending sequence of the resource indication information corresponding to each BWP corresponds to location information of the BWP in the system bandwidth, and the bandwidth information of the at least one BWP includes location information of the at least one BWP in the system bandwidth.

In a possible implementation, the resource indication information corresponding to each BWP includes a third RIV corresponding to the BWP, and the third RIV corresponding to the BWP is determined by the network device based on a relative start resource block RB index, of the resource in the BWP, in the BWP and a quantity of interlaced resource block groups IRGs included in the resource in the BWP.

In a possible implementation, if the network device does not allocate a resource to the terminal device in any BWP in the system bandwidth, resource indication information corresponding to the any BWP is preset resource indication information. The preset resource indication information is used to indicate that the resource allocated by the network device to the terminal device in the any BWP is empty.

For beneficial effects of the network device provided in the implementations of the fourth aspect, refer to beneficial effects brought by the implementations of the first aspect. Details are not described herein again.

According to a fifth aspect of this application, a network device is provided, including at least one processing element (or chip) configured to perform the method in the first aspect.

According to a sixth aspect of this application, a computer program product including an instruction is provided. When the computer program product is run on a computer, the computer is enabled to perform the method in the first aspect.

According to a seventh aspect of this application, a computer-readable storage medium is provided. The computer-readable storage medium stores an instruction. When the instruction is run on a computer, the computer is enabled to perform the method in the first aspect.

According to an eighth aspect, an embodiment of this application provides a terminal device, including:

a receiving module, configured to receive resource indication information sent by a network device, where the resource indication information is used to indicate location information of a resource in at least one bandwidth subset BWP in a system bandwidth and bandwidth information of the at least one BWP; and a sending module, configured to send uplink data to the network device on a resource corresponding to the resource indication information, where the resource is determined by the terminal device based on the resource indication information.

In a possible implementation, the receiving module is specifically configured to:

receive resource indication information that is sent by the network device in a preset sequence and that corresponds to each BWP in the system bandwidth, where the resource indication information corresponding to each BWP is used to indicate location information of a resource in the BWP, a sending sequence of the resource indication information corresponding to each BWP corresponds to location information of the BWP in the system bandwidth, and the bandwidth information of the at least one BWP includes location information of the at least one BWP in the system bandwidth.

In a possible implementation, the resource indication information corresponding to each BWP includes a third RIV corresponding to the BWP, and the third RIV corresponding to the BWP is determined by the network device based on a relative start resource block RB index, of the resource in the BWP, in the BWP and a quantity of interlaced resource block groups IRGs included in the resource in the BWP.

In a possible implementation, if the network device does not allocate a resource to the terminal device in any BWP in the system bandwidth, resource indication information corresponding to the any BWP is preset resource indication information. The preset resource indication information is used to indicate that the resource allocated by the network device to the terminal device in the any BWP is empty.

For beneficial effects of the terminal device provided in the implementations of the eighth aspect, refer to beneficial effects brought by the implementations of the second aspect. Details are not described herein again.

According to a ninth aspect, an embodiment of this application provides a terminal device, including a receiver and a transmitter.

The receiver is configured to receive resource indication information sent by a network device. The resource indication information is used to indicate location information of a resource in at least one bandwidth subset BWP in a system bandwidth and bandwidth information of the at least one BWP.

The transmitter is configured to send uplink data to the network device on a resource corresponding to the resource indication information. The resource is determined by the terminal device based on the resource indication information.

In a possible implementation, the receiver is specifically configured to:

receive resource indication information that is sent by the network device in a preset sequence and that corresponds to each BWP in the system bandwidth, where the resource indication information corresponding to each BWP is used to indicate location information of a resource in the BWP, a sending sequence of the resource indication information corresponding to each BWP corresponds to location information of the BWP in the system bandwidth, and the bandwidth information of the at least one BWP includes location information of the at least one BWP in the system bandwidth.

In a possible implementation, the resource indication information corresponding to each BWP includes a third RIV corresponding to the BWP, and the third RIV corresponding to the BWP is determined by the network device based on a relative start resource block RB index, of the resource in the BWP, in the BWP and a quantity of interlaced resource block groups IRGs included in the resource in the BWP.

In a possible implementation, if the network device does not allocate a resource to the terminal device in any BWP in the system bandwidth, resource indication information corresponding to the any BWP is preset resource indication information. The preset resource indication information is used to indicate that the resource allocated by the network device to the terminal device in the any BWP is empty.

For beneficial effects of the terminal device provided in the implementations of the ninth aspect, refer to beneficial effects brought by the implementations of the second aspect. Details are not described herein again.

According to a tenth aspect of this application, a terminal device is provided, including at least one processing element (or chip) configured to perform the method in the second aspect.

According to an eleventh aspect of this application, a computer program product including an instruction is provided. When the computer program product is run on a computer, the computer is enabled to perform the method in the second aspect.

According to a twelfth aspect of this application, a computer-readable storage medium is provided. The computer-readable storage medium stores an instruction. When the instruction is run on a computer, the computer is enabled to perform the method in the second aspect.

According to the data transmission method, the network device, or the terminal device provided in the foregoing aspects, in a possible implementation, the resource indication information includes a first resource indicator value RIV and identification information of any BWP. The first RIV is used to indicate location information of a resource in the any BWP, and the identification information of the any BWP is used to indicate bandwidth information of the any BWP.

In a possible implementation, the first RIV is determined by the network device based on a relative start resource block RB index of the resource in the any BWP and a quantity of interlaced resource block groups IRGs included in the resource.

In this embodiment of this application, the network device sends the resource indication information to the terminal device, so that the terminal device determines, based on the resource indication information, the resource allocated by the network device to the terminal device. The resource indication information includes the first resource indicator value RIV (used to indicate the location information of the resource allocated by the network device to the terminal device in the any BWP) and the identification information of the any BWP (used to indicate the bandwidth information of the any BWP). It can be learned that, in this embodiment, the resource indication information sent by the network device to the terminal device is used to indicate both the location information of the resource that is in the any BWP and that is allocated by the network device to the terminal device, and the bandwidth information of the any BWP, so that the terminal device can determine, based on the resource indication information, the resource allocated by the network device. Therefore, in this embodiment, the network device may indicate a system bandwidth of any size and/or a resource in any BWP in the system bandwidth to the terminal device, so that the terminal device can perform data transmission on the indicated resource. This implements flexible data transmission.

According to the data transmission method, the network device, or the terminal device provided in the foregoing aspects, in a possible implementation, the resource indication information includes a second resource indicator value RIV. The second RIV is used to indicate the location information of the resource in the at least one BWP and the bandwidth information of the at least one BWP.

In a possible implementation, the second RIV is determined by the network device based on a relative start resource block RB index, of a resource in each BWP, in the BWP, a quantity of interlaced resource block groups IRGs included in the resource in each BWP, and the bandwidth information of the at least one BWP.

In a possible implementation, the bandwidth information of the at least one BWP includes identification information of the at least one BWP.

In this embodiment of this application, the network device sends the resource indication information to the terminal device, so that the terminal device determines, based on the resource indication information, the resource allocated by the network device to the terminal device. The resource indication information includes the second resource indicator value RIV (used to indicate the location information, in the at least one BWP, of the resource allocated by the network device to the terminal device and the bandwidth information of the at least one BWP). It can be learned that, in this embodiment, the resource indication information sent by the network device to the terminal device is used to indicate both the location information of the resource that is in the at least one BWP and that is allocated by the network device to the terminal device, and the bandwidth information of the at least one BWP, so that the terminal device can determine, based on the resource indication information, the resource allocated by the network device. Therefore, in this embodiment, the network device may indicate a system bandwidth of any size and/or a resource in any BWP in the system bandwidth to the terminal device, so that the terminal device can perform data transmission on the indicated resource. This implements flexible data transmission.

According to the data transmission method, the network device, or the terminal device provided in the foregoing aspects, in a possible implementation, the resource indication information includes a combinatorial index value and quantity information of the at least one BWP. The combinatorial index value is used to indicate location information of a resource in each BWP, and the quantity information of the at least one BWP is used to indicate bandwidth information of the at least one BWP.

In a possible implementation, the combinatorial index value is determined by the network device based on a start interlaced resource block group IRG index and an end IRG index, of the resource in each BWP, in the BWP and the quantity information of the at least one BWP.

In this embodiment of this application, the network device sends the resource indication information to the terminal device, so that the terminal device determines, based on the resource indication information, the resource allocated by the network device to the terminal device. The resource indication information includes the combinatorial index value (the combinatorial index value is used to indicate the location information of the resource that is in each of the at least one BWP and that is allocated by the network device to the terminal device) and the quantity information of the at least one BWP (the quantity information of the at least one BWP is used to indicate the bandwidth information of the at least one BWP). It can be learned that, in this embodiment, the resource indication information sent by the network device to the terminal device is used to indicate both the location information of the resource that is in the at least one BWP and that is allocated by the network device to the terminal device, and the bandwidth information of the at least one BWP, so that the terminal device can determine, based on the resource indication information, the resource allocated by the network device. Therefore, in this embodiment, the network device may indicate a system bandwidth of any size and/or a resource in any BWP in the system bandwidth to the terminal device, so that the terminal device can perform data transmission on the indicated resource. This implements flexible data transmission.

According to a thirteenth aspect, an embodiment of this application provides a data transmission method, including:

sending, by a network device, resource indication information to a terminal device, where the resource indication information is used to indicate location information of two groups of inconsecutive resources in a system bandwidth; and receiving, by the network device on a resource corresponding to the resource indication information, uplink data sent by the terminal device.

According to the data transmission method provided in the thirteenth aspect, the network device sends the resource indication information to the terminal device, so that the terminal device determines, based on the resource indication information, a resource allocated by the network device to the terminal device. The resource indication information is used to indicate the location information of the two groups of inconsecutive resources in the system bandwidth. Further, the network device receives, on the resource corresponding to the resource indication information, the uplink data sent by the terminal device. It can be learned that, in this embodiment, the network device sends the resource indication information (used to indicate location information of any two groups of inconsecutive resources in the system bandwidth) to the terminal device, so that the terminal device can determine, based on the resource indication information, the resource allocated by the network device, and perform data transmission on the any two groups of indicated inconsecutive resources.

According to a fourteenth aspect, an embodiment of this application provides a data transmission method, including:

receiving, by a terminal device, resource indication information sent by a network device, where the resource indication information is used to indicate location information of two groups of inconsecutive resources in the system bandwidth; and sending, by the terminal device, uplink data to the network device on a resource corresponding to the resource indication information, where the resource is determined by the terminal device based on the resource indication information.

According to the data transmission method provided in the fourteenth aspect, the terminal device receives the resource indication information sent by the network device. The resource indication information is used to indicate the location information of the two groups of inconsecutive resources in the system bandwidth. Further, the terminal device sends the uplink data to the network device on the resource corresponding to the resource indication information. The resource is determined by the terminal device based on the resource indication information. It can be learned that, in this embodiment, the network device sends the resource indication information (used to indicate location information of any two groups of inconsecutive resources in the system bandwidth) to the terminal device, so that the terminal device can determine, based on the resource indication information, a resource allocated by the network device, and perform data transmission on any two groups of indicated inconsecutive resources.

According to a fifteenth aspect, an embodiment of this application provides a network device, including:

a sending module, configured to send resource indication information to a terminal device, where the resource indication information is used to indicate location information of two groups of inconsecutive resources in a system bandwidth; and a receiving module, configured to receive, on a resource corresponding to the resource indication information, uplink data sent by the terminal device.

For beneficial effects of the network device provided in the implementations of the fifteenth aspect, refer to beneficial effects brought by the implementations of the thirteenth aspect. Details are not described herein again.

According to a sixteenth aspect, an embodiment of this application provides a network device, including a transmitter and a receiver.

The transmitter is configured to send resource indication information to a terminal device. The resource indication information is used to indicate location information of two groups of inconsecutive resources in a system bandwidth.

The receiver is configured to receive, on a resource corresponding to the resource indication information, uplink data sent by the terminal device.

For beneficial effects of the network device provided in the implementations of the sixteenth aspect, refer to beneficial effects brought by the implementations of the thirteenth aspect. Details are not described herein again.

According to a seventeenth aspect of this application, a network device is provided, including at least one processing element (or chip) configured to perform the method in the thirteenth aspect.

According to an eighteenth aspect of this application, a computer program product including an instruction is provided. When the computer program product is run on a computer, the computer is enabled to perform the method in the thirteen aspect.

According to a nineteenth aspect of this application, a computer-readable storage medium is provided. The computer-readable storage medium stores an instruction. When the instruction is run on a computer, the computer is enabled to perform the method in the thirteenth aspect.

According to a twentieth aspect, an embodiment of this application provides a terminal device, including:

a receiving module, configured to receive resource indication information sent by a network device, where the resource indication information is used to indicate location information of two groups of inconsecutive resources in a system bandwidth; and a sending module, configured to send uplink data to the network device on a resource corresponding to the resource indication information, where the resource is determined by the terminal device based on the resource indication information.

For beneficial effects of the terminal device provided in the implementations of the twentieth aspect, refer to beneficial effects brought by the implementations of the fourteenth aspect. Details are not described herein again.

According to a twenty-first aspect, an embodiment of this application provides a terminal device, including a receiver and a transmitter.

The receiver is configured to receive resource indication information sent by a network device. The resource indication information is used to indicate location information of two groups of inconsecutive resources in a system bandwidth.

The transmitter is configured to send uplink data to the network device on a resource corresponding to the resource indication information. The resource is determined by the terminal device based on the resource indication information.

For beneficial effects of the terminal device provided in the implementations of the twenty-first aspect, refer to beneficial effects brought by the implementations of the fourteenth aspect. Details are not described herein again.

According to a twenty-second aspect of this application, a terminal device is provided, including at least one processing element (or chip) configured to perform the method in the fourteenth aspect.

According to a twenty-third aspect of this application, a computer program product including an instruction is provided. When the computer program product is run on a computer, the computer is enabled to perform the method in the fourteenth aspect.

According to a twenty-fourth aspect of this application, a computer-readable storage medium is provided. The computer-readable storage medium stores an instruction. When the instruction is run on a computer, the computer is enabled to perform the method in the fourteenth aspect.

According to the data transmission method, the network device, or the terminal device provided in the foregoing aspects, in a possible implementation, the resource indication information includes a combinatorial index value. The combinatorial index value is determined by the network device based on a start interlaced resource block group IRG index and an end IRG index of each group of resources in the system bandwidth.

In this embodiment of this application, the network device sends the resource indication information to the terminal device, so that the terminal device determines, based on the resource indication information, the resource allocated by the network device to the terminal device. The resource indication information includes the combinatorial index value (the combinatorial index value is determined by the network device based on the start interlaced resource block group IRG index and the end IRG index of each group of resources in the system bandwidth). Further, the network device receives, on the resource corresponding to the resource indication information, the uplink data sent by the terminal device. It can be learned that, in this embodiment, the network device sends the resource indication information (used to indicate location information of any two groups of inconsecutive resources in the system bandwidth) to the terminal device, so that the terminal device can determine, based on the resource indication information, the resource allocated by the network device, and perform data transmission on the any two groups of indicated inconsecutive resources.

DESCRIPTION OF EMBODIMENTS

First, a communications system and some terms in embodiments of this application are explained and described.

Figure 1A:
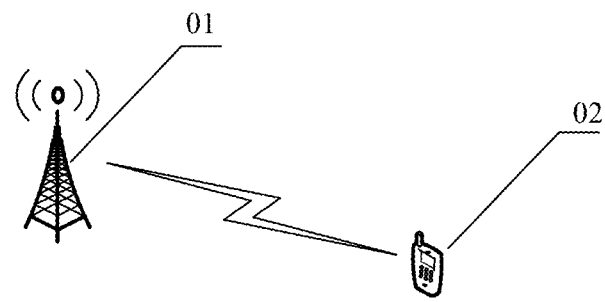
FIG. 1A is a schematic structural diagram of a communications system according to an embodiment of this application.

FIG. 1A is a schematic structural diagram of a communications system according to an embodiment of this application. As shown in FIG. 1A, the communications system includes a network device 01 and a terminal device 02. Certainly, the communications system may further include a plurality of terminal devices. Considering that processes of data transmission between the terminal devices and the network device 01 are similar, in this embodiment of this application, an example in which data transmission is performed between the terminal device 02 and the network device 01 is used for description. Optionally, the communications system may be a long term evolution (Long Term Evolution, LTE) communications system or a fifth-generation (5-Generation, 5G) mobile communications system, such as an NR system. Certainly, the communications system may alternatively be another type of communications system. This is not limited in this embodiment of this application.

A network device included in this application may include but is not limited to a base station and a transmission reception point (Transmission Reception Point, TRP). The base station is also referred to as a radio access network (Radio Access Network, RAN) device, and is a device connecting a terminal to a wireless network. The base station may be a base transceiver station (Base Transceiver Station, BTS) in global system for mobile communications (Global System for Mobile communications, GSM) or code division multiple access (Code Division Multiple Access, CDMA); or may be a NodeB (NodeB, NB) in wideband code division multiple access (Wideband Code Division Multiple Access, WCDMA); or may further be an evolved NodeB (evolved Node B, eNB or eNodeB) in long term evolution (Long Term Evolution, LTE), a relay station or an access point, a base station device in a future 5G network, or the like. This is not limited herein.

A terminal device involved in this application may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a radio access network (Radio Access Network, RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (Personal Communication Service, PCS) phone, a cordless phone, a session initiation protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile (Mobile), a remote station (Remote Station), a remote terminal (Remote Terminal), an access terminal (Access Terminal), a user terminal (User Terminal), a user agent (User Agent), a user device (User Device or User Equipment). This is not limited herein.

The terminal device or the network device in this application may include a hardware layer, an operating system layer running above the hardware layer, and an application layer running above the operating system layer. The hardware layer includes hardware such as a central processing unit (Central Processing Unit, CPU), a memory management unit (Memory Management Unit, MMU), and a memory (also referred to as a main memory). The operating system may be any one or more of types of computer operating systems that implement service processing by using a process (Process), for example, a Linux operating system, a Unix operating system, an Android operating system, an iOS operating system, or a Windows operating system. The application layer includes applications such as a browser, an address book, word processing software, and instant messaging software.

A bandwidth subset (bandwidth part, BWP) (or referred to as a sub-band) in the embodiments of this application is a partial bandwidth in a system bandwidth. Optionally, to support flexible bandwidth transmission, in the embodiments of this application, a transmission bandwidth in the system bandwidth may be divided into a preset quantity of BWPs in advance, and the network device may allocate a resource (resource) in any one or more BWPs to the terminal device for use. For example, it is assumed that a supported maximum system bandwidth is 80 MHz, and the maximum system bandwidth may be divided into four 20 MHZ-size BWPs in advance, to implement flexible bandwidth transmission of 20 M, 40 M, 60 M, and 80 M.

The system bandwidth in the embodiments of this application may change, and is not limited to a fixed bandwidth value. For example, the system bandwidth may be 20 M, 40 M, 60 M, 80 M, or the like.

Optionally, a resource in the embodiments of this application may include one or more interlaced resource block groups (Interlaced Resource block Group, IRG). The IRG may also be referred to as a resource interlace (interlace). Certainly, another resource unit may be further included. This is not limited in the embodiments of this application. For example, the resource in this application may be a resource set. The resource set may be a resource set including resource blocks RBs, or may be a set including resource elements (resource element, RE). In different implementations, the resource blocks RBs and/or the resource elements REs included in the resource set may be evenly distributed or unevenly distributed.

Figure 1B:
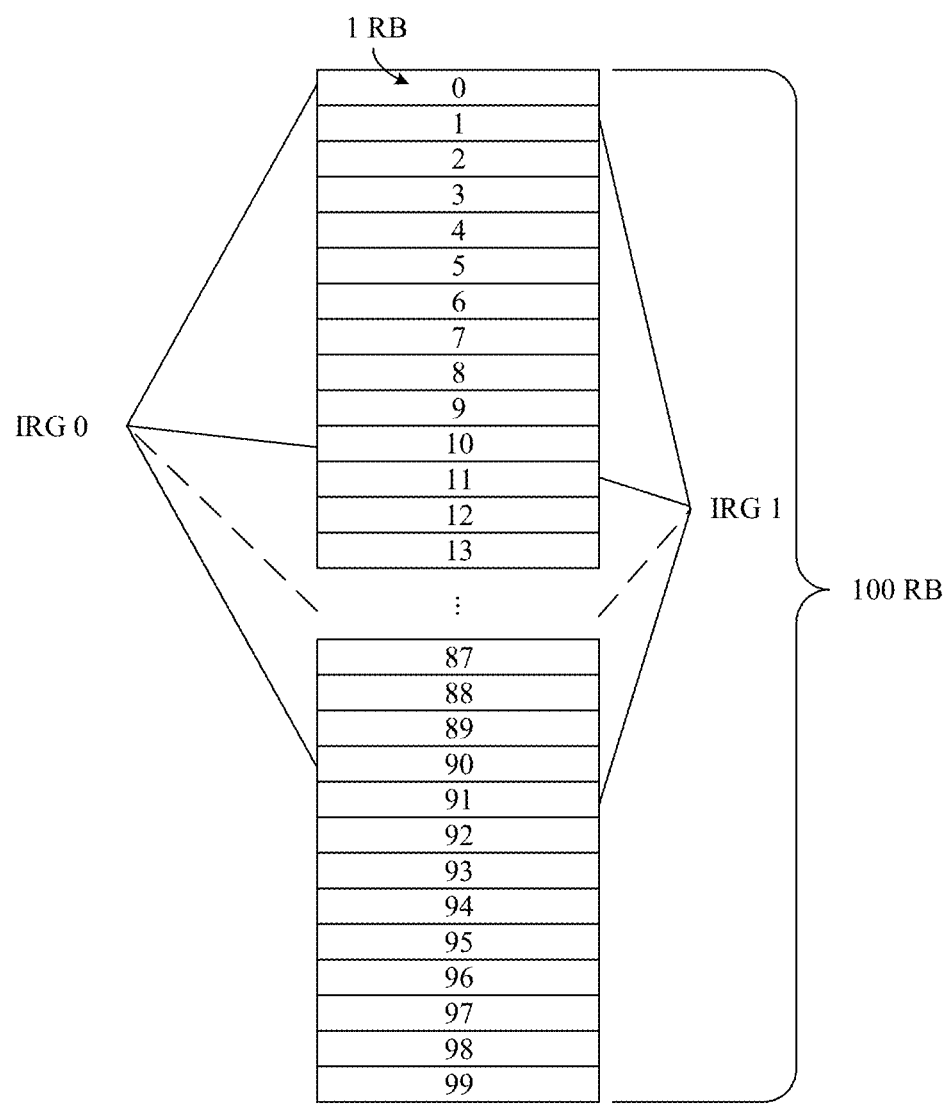
FIG. 1B is a schematic structural diagram of division of a transmission bandwidth according to an embodiment of this application.

The IRG in the embodiments of this application includes an integer quantity of resource blocks (Resource Block, RB) that are discretely distributed at an equal interval. One RB includes 12 subcarriers in frequency domain, and includes seven orthogonal frequency division multiplexing (Orthogonal Frequency Division Multiplexing, OFDM) symbols in time domain. FIG. 1B is a schematic structural diagram of division of a transmission bandwidth according to an embodiment of this application. As shown in FIG. 1B, it is assumed that a transmission bandwidth in a 20 M system bandwidth scenario includes 100 RBs, and the 100 RBs are divided into 10 IRGs based on a structure in which each IRG includes 10 RBs (namely, indexes of the IRGs are 0 to 9). Each IRG includes 10 RBs, and the 10 RBs are discretely distributed in the entire transmission bandwidth at an equal interval. For example, indexes of RBs included in an IRG 0 (namely, an IRG whose index is 0) include: 0, 10, 20, 30, 40, 50, 60, 70, 80, and 90.

In the embodiments of this application, in a flexible system bandwidth scenario, there is a same RB spacing spaced by two adjacent RBs in corresponding IRGs in different system bandwidth scenarios. For example, assuming that the transmission bandwidth in the 20 M system bandwidth scenario includes 100 RBs, the 100 RBs are divided into 10 IRGs (as shown in FIG. 1B) based on a structure in which each IRG includes 10 RBs. There is a spacing of 10 RBs spaced by two adjacent RBs in any IRG. It is assumed that a transmission bandwidth in a 40 M system bandwidth scenario includes 210 RBs. The 210 RBs are divided into 10 IRGs based on a structure in which each IRG includes 21 RBs. There are also 10 RBs spaced by two adjacent RBs in any IRG. It should be noted that the quantity of RBs is merely an example for description, and is used to facilitate description of the solution. This is not limited in the embodiments of this application.

Parameter values such as a subcarrier spacing, a system bandwidth, and a transmission bandwidth in the embodiments of this application are merely used as an example to describe this solution. Certainly, another value may alternatively be used. This is not limited in the embodiments of this application.

Numbers in the embodiments of this application, such as "first", "second", and "third", are used to distinguish between similar objects, but are not necessarily used to describe a specific sequence or a chronological order, and should not constitute any limitation on the embodiments of this application.

Generally, a spectrum resource includes: a licensed spectrum resource and an unlicensed spectrum resource. The licensed spectrum resource is a spectrum resource that is designated by a Radio Regulation Committee of a government and has a special purpose (for example, that only a specified communications system is allowed to use the spectrum resource). The unlicensed spectrum resource, also referred to as a shared spectrum resource, refers to a spectrum resource designated by a relevant government department, but allows any communications system to use the spectrum resource to perform data communication. Development of wireless communications technologies leads to a strain on licensed spectrum resources, driving research on unlicensed spectrum resources. A licensed assisted access (License Assisted Access, LAA) technology and an enhanced licensed-assisted access (enhanced LAA, eLAA) technology are sequentially introduced into a 3rd generation partnership project (3GPP, 3rd Generation Partnership Project). In other words, an LTE or LTE evolved system is deployed on the unlicensed spectrum resource in a non-standalone (Non-standalone) manner, and the unlicensed spectrum resource is used to a maximum extent with assistance of the licensed spectrum resource. Similarly, the unlicensed spectrum resource is also used in an NR system to meet a service requirement, so as to improve user experience.

To improve utilization of the unlicensed spectrum resource, when using the unlicensed spectrum resource, a communications device in a communications system needs to comply with usage specifications formulated for the unlicensed spectrum resource, for example, aspects such as a channel access mechanism, a transmit power limit, and a spectrum resource occupation rate. Therefore, an appropriate data transmission scheme needs to be designed to meet the foregoing various usage specifications.

In an existing LTE system and an evolved LTE system, a network device sends location information (used to indicate a location of a resource allocated by the terminal device to a terminal device on a system bandwidth) to the terminal device, and further, the terminal device may learn, based on the location information, the location of the resource allocated by the network device to the terminal device, and then perform data transmission on a corresponding resource. However, the system bandwidth in the LTE system is fixed. In other words, a data transmission solution in the prior art is applicable only to data transmission performed by a communications device on a system bandwidth of a fixed size.

However, with development of a communications system and/or a bandwidth technology, a communications device in an NR system needs to perform data transmission in a scenario with a larger system bandwidth and a variable system bandwidth, so as to improve communications system performance and/or improve user experience. Therefore, how to indicate a resource required for data transmission to the terminal device in the scenario with a larger system bandwidth and a variable system bandwidth, so that the terminal device can perform data transmission in the scenario, becomes a technical problem to be urgently resolved currently.

According to a data transmission method, a network device, and a terminal device provided in the embodiments of this application, the network device sends resource indication information to the terminal device. The resource indication information is used to indicate both location information of a resource that is in at least one BWP and that is allocated by the network device to the terminal device and bandwidth information of the at least one BWP, so that the terminal device can determine, based on the resource indication information, the resource allocated by the network device. Therefore, in the embodiments, the network device may indicate a system bandwidth of any size and/or a resource in any BWP in the system bandwidth to the terminal device, so that the terminal device can perform data transmission on the indicated resource. This implements flexible data transmission.

Certainly, the data transmission method, the network device, and the terminal device provided in the embodiments of this application are applicable to data transmission on the unlicensed spectrum resource, and applicable to another spectrum resource. This is not limited in the embodiments of this application.

The following uses specific embodiments to describe in detail the technical solutions in this application and how the foregoing technical problem is resolved in the technical solutions in this application. The following several specific embodiments may be combined with each other, and a same or similar concept or process may not be described repeatedly in some embodiments.

Figure 2:
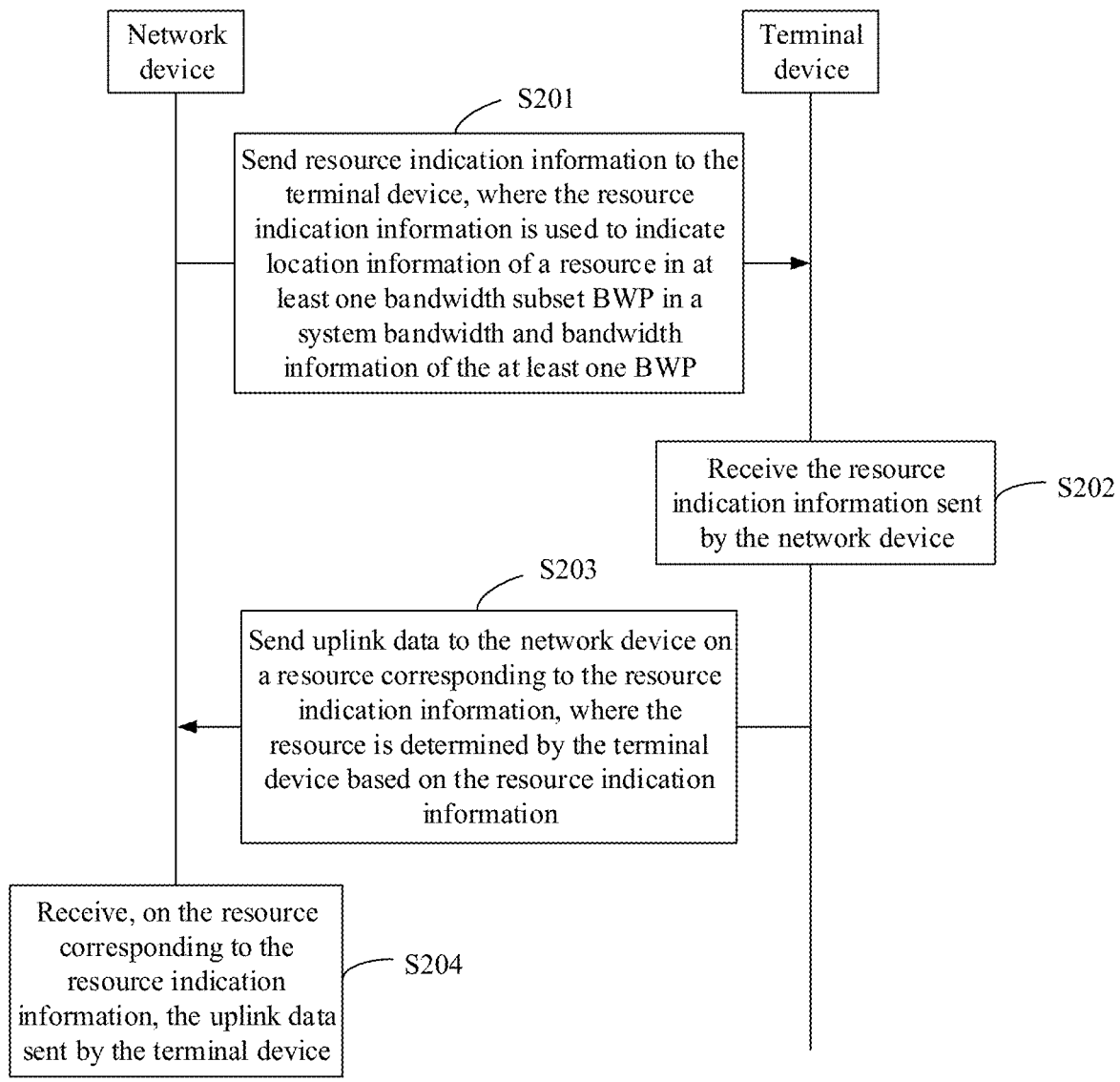
FIG. 2 is a schematic flowchart of a data transmission method according to an embodiment of this application.

FIG. 2 is a schematic flowchart of a data transmission method according to an embodiment of this application. As shown in FIG. 2, the method in this embodiment of this application may include the following steps.

Step S201. A network device sends resource indication information to a terminal device, where the resource indication information is used to indicate location information of a resource in at least one bandwidth subset BWP in a system bandwidth and bandwidth information of the at least one BWP.

In this embodiment, optionally, after determining a resource (one or more groups of resources) allocated to the terminal device, the network device sends the resource indication information to the terminal device, so that the terminal device can determine, based on the resource indication information, the resource (for example, a specific BWP in which the resource is located and a corresponding resource location) allocated by the network device to the terminal device. For example, if the network device determines that the resource allocated to the terminal device includes a resource 1 (including one or more IRGs) located in a BWP 1 in the system bandwidth and a resource 3 (including one or more IRGs) located in a BWP 3 in the system bandwidth, the resource indication information is used to indicate location information of the resource 1 in the BWP 1, location information of the resource 3 in the BWP 3, and bandwidth information of BWP 1 and BWP 3.

Optionally, the network device may allocate the resource in the at least one BWP in the system bandwidth to the terminal device based on parameters such as a service requirement of the terminal device and a listen before talk (listen before talk, LBT) result. Certainly, the network device may alternatively determine, in another manner, the resource allocated to the terminal device. This is not limited in this embodiment of this application.

It can be learned that, compared with the prior art in which a network device sends, to a terminal device, only location information used to indicate a resource that is in the system bandwidth and that is allocated to the terminal device, in this embodiment, the resource indication information sent by the network device to the terminal device is used to indicate both the location information of the resource that is in the at least one BWP in the system bandwidth and that is allocated to the terminal device, and the bandwidth information of the at least one BWP. Therefore, in this embodiment, the network device may indicate a system bandwidth of any size and/or a resource in any BWP in the system bandwidth to the terminal device, so that the terminal device can perform data transmission on the indicated resource. This implements flexible data transmission.

Optionally, the resource indication information sent by the network device to the terminal device in this embodiment may include at least the following several implementations.

Implementation 1: The resource indication information includes a first resource indicator value (resource indicator value, RIV) and identification information of any BWP. The first RIV is used to indicate location information of a resource in the any BWP, and the identification information of the any BWP is used to indicate bandwidth information of the any BWP.

In this embodiment, optionally, the network device determines to allocate the resource in the any BWP to the terminal device, determines the first RIV based on the location information of the resource in the any BWP, and determines the identification information of the any BWP (used to indicate the any BWP) based on the bandwidth information of the any BWP (for example, location information of the any BWP in the system bandwidth). Further, the network device sends the resource indication information to the terminal device, so that the terminal device determines, based on the resource indication information, a resource (for example, a specific resource in a specific BWP) allocated by the network device. The resource indication information includes the first resource indicator value RIV and the identification information of the any BWP. The first RIV is used to indicate the location information of the resource in the any BWP, and the identification information of the any BWP is used to indicate the bandwidth information of the any BWP.

Optionally, the first RIV is determined by the network device based on a relative start resource block RB index of the resource in the any BWP and a quantity of interlaced resource block groups IRGs included in the resource.

Optionally, the network device determines that an RB set in the IRG included in the resource that is in the any BWP and that is allocated to the terminal device is $RB_{start1}+l+i*N$. $RB_{start1}$ represents the relative start resource block RB index of the resource in the any BWP. l=0, 1, . . . , and L−1. L represents a quantity of interlaced resource block groups IRGs allocated by the network device to the terminal device (or the quantity of interlaced resource block groups IRGs included in the resource). i=0, 1, . . . , and $M_1-1$. $M_1$ represents a quantity of RBs included in each IRG in the any BWP, and $M_1=\lfloor N_{RB}^{BWP1}/N \rfloor$. N represents a quantity of RBs spaced by two adjacent RBs in each IRG. $N_{RB}^{BWP1}$ represents a transmission bandwidth corresponding to the any BWP. Further, the network device determines the first RIV based on the relative start resource block RB index (for example, $RB_{start1}$) of the resource in the any BWP and the quantity (for example, L) of interlaced resource block groups IRGs included in the resource.

Optionally, the network device may determine the first RIV in at least the following manners based on the relative start resource block RB index of the resource in the any BWP and the quantity of interlaced resource block groups IRGs included in the resource.

If $L-1 \leq \lfloor N/2 \rfloor$, first RIV=$N(L-1)+RB_{start1}$, and otherwise, first RIV=$N(N-L+1)+(N-1-RB_{start1})$.

Certainly, the network device may further determine the first RIV in another manner. This is not limited in this embodiment of this application.

Implementation 2: The resource indication information includes a second resource indicator value RIV. The second RIV is used to indicate the location information of the resource in the at least one BWP and the bandwidth information of the at least one BWP.

In this embodiment, optionally, the network device determines to allocate the resource in the at least one BWP to the terminal device, and determines the second RIV based on the location information of the resource in the at least one BWP and the bandwidth information of the at least one BWP (for example, identification information of the at least one BWP). Further, the network device sends the resource indication information to the terminal device, so that the terminal device determines, based on the resource indication information, the resource (for example, a specific resource in a specific BWP) allocated by the network device. The resource indication information includes the second resource indicator value RIV, and the second RIV is used to indicate the location information of the resource in the at least one BWP and the bandwidth information of the at least one BWP.

Optionally, the second RIV is determined by the network device based on a relative start resource block RB index, of a resource in each BWP, in the BWP, a quantity of interlaced resource block groups IRGs included in the resource in each BWP, and the bandwidth information of the at least one BWP.

Optionally, the network device determines that an RB set in the IRG included in the resource that is in each BWP and that is allocated to the terminal device is $RB_{start2}+l+i*N$. $RB_{start2}$ represents the relative start resource block RB index, of the resource in each BWP, in the BWP. l=0, 1, . . . , and L−1. L represents a quantity of interlaced resource block groups IRGs allocated by the network device to the terminal device (or the quantity of interlaced resource block groups IRGs included in the resource on each resource). i=0, 1, . . . , and $M_2-1$. $M_2$ represents a quantity of RBs included in each IRG in each BWP, and $M_2=\lfloor N_{RB}^{BWP2}/N \rfloor$. N represents a quantity of RBs spaced by two adjacent RBs in each IRG. $N_{RB}^{BWP2}$ represents a transmission bandwidth corresponding to each BWP. Further, the network device determines the second RIV based on the relative start resource block RB index (for example, $RB_{start2}$), of the resource in each BWP, in the BWP, the quantity (for example, L) of interlaced resource block groups IRGs included in the resource in each BWP, and the bandwidth information of the at least one BWP.

Optionally, the network device may determine the second RIV in at least the following manners based on the relative start resource block RB index, of the resource in each BWP, in the BWP, the quantity of interlaced resource block groups IRGs included in the resource in each BWP, and the bandwidth information of the at least one BWP.

If $L-1 \leq \lfloor N/2 \rfloor$, second $$RIV = N(L-1) + RB_{start2} + BWP_{ID} * \frac{N(N+1)}{2},$$

and otherwise, second $$RIV = N(N-L+1) + (N-1-RB_{start2}) + BWP_{ID} * \frac{N(N+1)}{2}.$$

$BWP_{ID}$ represents the identification information of the at least one BWP (for example, an ID of a set including the at least one BWP).

Certainly, the network device may further determine the second RIV in another manner. This is not limited in this embodiment of this application.

Implementation 3: That the network device sends the resource indication information to the terminal device includes:

The network device sends, to the terminal device in a preset sequence, resource indication information corresponding to each BWP in the system bandwidth. The resource indication information corresponding to each BWP is used to indicate location information of a resource in the BWP, a sending sequence of the resource indication information corresponding to each BWP corresponds to location information of the BWP in the system bandwidth, and the bandwidth information of the at least one BWP includes the location information of the at least one BWP in the system bandwidth.

In this embodiment, optionally, the network device determines to allocate the resource in the at least one BWP in the system bandwidth to the terminal device, and determines, based on the location information of the resource in each BWP, the resource indication information corresponding to the BWP. Further, the network device sends, to the terminal device in the preset sequence, the resource indication information corresponding to each BWP in the system bandwidth, so that the terminal device determines, based on the resource indication information corresponding to each BWP and a receiving sequence of the resource indication information corresponding to each BWP, the resource (for example, a specific resource in a specific BWP) allocated by the network device. The resource indication information corresponding to each BWP is used to indicate the location information of the resource in the BWP, and the sending sequence of the resource indication information corresponding to each BWP corresponds to the location information of the BWP in the system bandwidth (to be specific, the terminal device may determine the location information of each BWP in the system bandwidth based on the receiving sequence of the resource indication information corresponding to each BWP, in other words, determine each BWP). The bandwidth information of the at least one BWP includes the location information of the at least one BWP in the system bandwidth. Optionally, if the network device does not allocate a resource to the terminal device in any BWP in the system bandwidth, resource indication information corresponding to the any BWP is preset resource indication information. The preset resource indication information is used to indicate that the resource allocated by the network device to the terminal device in the any BWP is empty (in other words, if learning that the resource indication information corresponding to the any BWP is the preset resource indication information, the terminal device determines that the network device does not allocate the resource to the terminal device in the any BWP).

For example, it is assumed that the system bandwidth includes three BWPs (a BWP 1, a BWP 2, and a BWP 3). After the network device determines to allocate a resource 1 in the BWP 1 and a resource 3 in the BWP 3 to the terminal device, the network device determines, based on location information of the resource 1 in the BWP 1, resource indication information 1 corresponding to the BWP 1, and determines, based on location information of the resource 3 in the BWP 3, resource indication information 3 corresponding to the BWP 3. Resource indication information 2 corresponding to the BWP 2 is preset resource indication information. Further, the network device sends, to the terminal device in the preset sequence, the resource indication information corresponding to each BWP in the system bandwidth (for example, sequentially sends the resource indication information 1, the resource indication information 2, and the resource indication information 3), so that the terminal device determines, based on the receiving sequence of the resource indication information corresponding to each BWP and corresponding resource indication information, the resource (for example, the resource 1 in the BWP 1 and the resource 3 in the BWP 3) allocated by the network device.

Optionally, the resource indication information corresponding to each BWP includes a third RIV corresponding to the BWP. Because a sending sequence of the third RIV corresponding to each BWP corresponds to the location information of the BWP in the system bandwidth, the third RIV corresponding to each BWP may be used to indicate both the location information of the resource in the BWP and the bandwidth information of the BWP (to be specific, the terminal device may determine the location information of each BWP in the system bandwidth based on a receiving sequence of the third RIV corresponding to each BWP, in other words, determine each BWP).

Optionally, the third RIV corresponding to each BWP is determined by the network device based on a relative start resource block RB index, of the resource in the BWP, in the BWP and a quantity of interlaced resource block groups IRGs included in the resource in the BWP.

Optionally, an RB set in the IRG included in the resource that is in each BWP and that the network device determines to allocate to the terminal device and is $RB_{start2}+1+i*N$. Further, the network device determines, based on the relative start resource block RB index (for example, $RB_{start2}$), of the resource in each BWP, in the corresponding BWP and the quantity (for example, L) of interlaced resource block groups IRGs included in the resource in each BWP, the third RIV corresponding to each BWP.

Optionally, the network device may determine, in at least the following manners based on the relative start resource block RB index (for example, $RB_{start2}$), of the resource in the any BWP, in the any BWP and the quantity (for example, L) of interlaced resource block groups IRGs included in the resource in the any BWP, the third IRG corresponding to the any BWP.

If $L-1 \leq \lfloor N/2 \rfloor$, third $RIV=N(L-1)+RB_{start2}$, and otherwise, third $RIV=N(N-L+1)+(N-1-RB_{start2})$.

Certainly, the network device may further determine the third RIV in another manner. This is not limited in this embodiment of this application.

Implementation 4: The resource indication information includes a combinatorial index value and quantity information of the at least one BWP. The combinatorial index value is used to indicate location information of a resource in each BWP, and the quantity information of the at least one BWP is used to indicate the bandwidth information of the at least one BWP.

In this embodiment, optionally, the network device determines to allocate the resource in the at least one BWP to the terminal device, and determines the combinatorial index value based on the location information of the resource in each BWP and the bandwidth information of the at least one BWP (for example, the identification information or the quantity information of the at least one BWP). Further, the network device sends the resource indication information to the terminal device, so that the terminal device determines, based on the resource indication information, the resource (for example, a specific resource in a specific BWP) allocated by the network device. The resource indication information includes the combinatorial index value and the quantity information of the at least one BWP, and the combinatorial index value is used to indicate the location information of the resource in each BWP.

Optionally, the combinatorial index value is determined by the network device based on a start interlaced resource block group IRG index and an end IRG index, of the resource in each BWP, in the BWP, and the quantity information of the at least one BWP.

Optionally, the network device determines the location information (for example, the start interlaced resource block group IRG index and the end IRG index, of the resource in each BWP, in the BWP) of the resource that is in each of the at least one BWP and that is allocated to the terminal device, and the bandwidth information of the at least one BWP (for example, the quantity information of the at least one BWP). Further, the combinatorial index value is determined by the network device based on the start interlaced resource block group IRG index and the end IRG index, of the resource in each BWP, in the BWP, and the quantity information of the at least one BWP.

Optionally, the IRG index of the at least one BWP has a unique index (namely, an absolute index) in the entire system bandwidth. For example, indexes of 10 IRGs in a BWP #0 are respectively 0 to 9, indexes of 10 IRGs in a BWP #1 are respectively 10 to 19, and indexes of 10 IRGs in a BWP #2 are respectively 20 to 29.

Optionally, the network device may determine the combinatorial index value in at least the following manners based on the start interlaced resource block group IRG index and the end IRG index, of the resource in each BWP, in the BWP, and the quantity information of the at least one BWP.

For ease of description, it is assumed that the start interlaced resource block group IRG index and the end IRG index, of the resource in each BWP, in the BWP are respectively $s_{2j}$ and $s_{2j+1}$. $j=0, 1, \ldots$, and $N_{BWP}-1$. $N_{BWP}$ represents the quantity information of the at least one BWP. Therefore, a manner of calculating the combinatorial index value is as follows:

The combinatorial index value is $$r1 = \sum_{k1=0}^{K1-1} \binom{P1 - s_{k1}}{K1 - k1}.$$

$K1=2*N_{BWP}$, and P1 represents a total quantity of IRGs in all BWPs in the system bandwidth. A function is $$\binom{x}{y} = \begin{cases} \binom{x}{y} & x \geq y \\ 0 & x < y \end{cases},$$

and a function is $$\binom{x}{y} = \frac{x!}{y!(x-y)!},$$

where x! represents a factorial of X.

Certainly, the network device may further determine the combinatorial index value in another manner. This is not limited in this embodiment of this application.

Implementation 5: The resource indication information includes a fourth resource indicator value RIV and quantity information of the at least one BWP. The fourth RIV is used to indicate location information of a resource in each BWP in the at least one BWP, and the quantity information of the at least one BWP is used to indicate the bandwidth information of the at least one BWP.

In this embodiment, optionally, the network device determines to allocate the resource in the at least one BWP to the terminal device, and determines the fourth RIV based on the location information of the resource in each BWP and the bandwidth information of the at least one BWP (for example, the identification information or the quantity information of the at least one BWP). Further, the network device sends the resource indication information to the terminal device, so that the terminal device determines, based on the resource indication information, the resource (for example, a specific resource in a specific BWP) allocated by the network device. The resource indication information includes the fourth RIV and the quantity information of the at least one BWP. The fourth RIV is used to indicate the location information of the resource in each BWP.

Optionally, the fourth RIV is determined by the network device based on one or more of a start interlaced resource block group IRG index $IRG_{start}$, a quantity L of IRGs allocated to the terminal device, a total quantity N of interlaced resource block groups IRGs, and the quantity information of the at least one BWP.

If $L-1 \leq \lfloor N/2 \rfloor$, fourth $RIV=N(L-1)+IRG_{start}$, and otherwise, fourth $RIV=N(N-L+1)+(N-1-IRG_{start})$.

Certainly, the network device may further determine the fourth RIV in another manner. This is not limited in this embodiment of this application.

Certainly, the resource indication information sent by the network device to the terminal device in this embodiment may further include another possible implementation. This is not limited in this embodiment of this application.

Step S202. The terminal device receives the resource indication information sent by the network device.

In this embodiment, the terminal device receives the resource indication information sent by the network device. The resource indication information is used to indicate the location information of the resource in the at least one BWP in the system bandwidth and the bandwidth information of the at least one BWP.

For an implementation of the resource indication information, refer to the related content in step S201. Details are not described again in this embodiment.

Step S203. The terminal device sends uplink data to the network device on a resource corresponding to the resource indication information, where the resource is determined by the terminal device based on the resource indication information.

In this embodiment, optionally, after receiving the resource indication information sent by the network device, the terminal device determines, based on the resource indication information, the resource (for example, a specific resource in a specific BWP) allocated by the network device to the terminal device. Further, the terminal device sends the uplink data to the network device on the resource (namely, the resource allocated by the network device to the terminal device) corresponding to the resource indication information.

Optionally, when the resource indication information sent by the network device to the terminal device is implemented in different implementations, the terminal device determines, in a corresponding implementation based on the resource indication information, the resource allocated by the network device to the terminal device. The following describes several possible implementations in which the terminal device determines, based on the resource indication information, the resource allocated by the network device to the terminal device.

Implementation 1: The resource indication information includes a first resource indicator value RIV and identification information of any BWP. The first RIV is used to indicate location information of a resource that is allocated by the network device to the terminal device and that is in any BWP, and the identification information of the any BWP is used to indicate bandwidth information of the any BWP. Correspondingly, the terminal device determines the location information (for example, $RB_{start1}$ and L) of the resource in the any BWP based on the first RIV, and determines, based on the location information of the resource in the any BWP and the identification information of the any BWP (used to indicate the any BWP, in other words, used to indicate a specific BWP on which the resource allocated by the network device to the terminal device is located), an actual location (for example, a specific resource in a specific BWP) in the system bandwidth on which the resource allocated by the network device to the terminal device is located. Optionally, an absolute index of an RB included in the resource in the any BWP is $RB_{start1ac1}=RB_{start1}+RB_{offset1}$. $RB_{offset1}$ represents an index offset of a start RB in the any BWP.

Implementation 2: The resource indication information includes a second resource indicator value RIV, and the second RIV is used to indicate location information of a resource that is allocated by the network device to the terminal device and that is in at least one BWP and the bandwidth information of the at least one BWP. Correspondingly, the terminal device determines the location information (for example, $RB_{start2}$ and L) of a resource in each of the at least one BWP and the bandwidth information of the at least one BWP (for example, the identification information of the at least one BWP that is used to indicate a specific BWP on which the resource allocated by the network device to the terminal device is located) based on the second RIV. Further, the terminal device determines, based on the location information of the resource in the at least one BWP and the bandwidth information of the at least one BWP (for example, the identification information of the at least one BWP), an actual location (for example, a specific resource in a specific BWP) in the system bandwidth on which the resource allocated by the network device to the terminal device is located. Optionally, an absolute index of an RB included in the resource in the any BWP is $RB_{start2ac2}=RB_{start2}+RB_{offset2}$. $RB_{offset2}$ represents an index offset of a start RB in the BWP.

Implementation 3: The network device sends, to the terminal device in a preset sequence, resource indication information corresponding to each BWP in the system bandwidth. The resource indication information corresponding to each BWP is used to indicate location information of a resource in the BWP, and a sending sequence of the resource indication information corresponding to each BWP corresponds to location information of the BWP in the system bandwidth. Correspondingly, the terminal device receives the resource indication information that is sent by the network device in the preset sequence and that corresponds to each BWP in the system bandwidth. Optionally, the terminal device determines, based on the resource indication information corresponding to each BWP, the location information of the resource in the corresponding BWP, and determines location information of the corresponding BWP in the system bandwidth based on a receiving sequence of the resource indication information corresponding to each BWP. Optionally, if resource indication information corresponding to any BWP is preset resource indication information, the terminal device determines that the network device does not allocate a resource to the terminal device in the any BWP.

Further, the terminal device determines, based on the location information of the resource in each BWP and bandwidth information of each BWP (for example, the location information of each BWP in the system bandwidth), a resource (for example, a specific resource in a specific BWP) allocated by the network device to the terminal device.

Optionally, the resource indication information corresponding to each BWP includes a third RIV corresponding to the BWP, and the third RIV corresponding to each BWP is used to indicate the location information of the resource in the BWP and the bandwidth information of the BWP. Correspondingly, the terminal device determines the location information (for example, $RB_{start2}$ and L) of the resource in the corresponding BWP based on the third RIV corresponding to each BWP, and determines the location information of the corresponding BWP in the system bandwidth based on a receiving sequence of the third RIV corresponding to each BWP. Further, the terminal device determines, based on the location information of the resource in each BWP and the bandwidth information of each BWP (for example, the location information of each BWP in the system bandwidth), an actual location (for example, a specific resource in a specific BWP) in the system bandwidth on which the resource allocated by the network device to the terminal device is located.

Implementation 4: The resource indication information includes a combinatorial index value and quantity information of the at least one BWP. The combinatorial index value is used to indicate location information of a resource in each of the at least one BWP allocated by the network device to the terminal device. The quantity information of the at least one BWP is used to indicate the bandwidth information of the at least one BWP. Correspondingly, the terminal device determines the location information (for example, the foregoing start IRG index and the end IRG index) of the resource in each of the at least one BWP based on the combinatorial index value and the quantity information of the at least one BWP, in other words, the terminal device determines a resource (for example, a specific resource in a specific BWP) allocated by the network device to the terminal device.

Implementation 5: The resource indication information includes a fourth resource indicator value RIV and quantity information of the at least one BWP. The combinatorial index value is used to indicate location information of a resource in each of the at least one BWP allocated by the network device to the terminal device. The quantity information of the at least one BWP is used to indicate the bandwidth information of the at least one BWP. Correspondingly, the terminal device determines the location information (for example, the foregoing start IRG index and the end IRG index) of the resource in each of the at least one BWP based on the combinatorial index value and the quantity information of the at least one BWP, in other words, the terminal device determines a resource (for example, a specific resource in a specific BWP) allocated by the network device to the terminal device.

Implementation 6: The resource indication information may not include the bandwidth information of the at least one BWP. The bandwidth information may be an initial access bandwidth of the terminal device, or the bandwidth information may be obtained by using other signaling. For example, the bandwidth information is obtained based on a system message. It may be understood that the allocated bandwidth information may alternatively be obtained in another manner. This is not limited in this application.

Certainly, the terminal device may alternatively determine, in another possible implementation based on the resource indication information, the resource allocated by the network device to the terminal device. This is not limited in this embodiment of this application.

Step S204: The network device receives, on a resource corresponding to the resource indication information, the uplink data sent by the terminal device.

In this embodiment, the network device sends the resource indication information to the terminal device. The resource indication information is used to indicate the location information of the resource in the at least one BWP in the system bandwidth and the bandwidth information of the at least one BWP. Further, after receiving the resource indication information sent by the network device, the terminal device sends the uplink data to the network device on the resource corresponding to the resource indication information. Further, the network device receives, on the resource corresponding to the resource indication information, the uplink data sent by the terminal device. It can be learned that in this embodiment, the resource indication information sent by the network device to the terminal device is used to indicate both the location information of the resource that is in the at least one BWP and that is allocated by the network device to the terminal device and the bandwidth information of the at least one BWP, so that the terminal device can determine, based on the resource indication information, the resource allocated by the network device. Therefore, in this embodiment, the network device may indicate a system bandwidth of any size and/or a resource in any BWP in the system bandwidth to the terminal device, so that the terminal device can perform data transmission on the indicated resource. This implements flexible data transmission.

In a data transmission method provided in another embodiment of this application, based on the foregoing embodiment, an implementation process in which the foregoing resource indication information includes the first resource indicator value RIV (used to indicate the location information of the resource allocated by the network device to the terminal device in any BWP) and the identification information of the any BWP is described in detail.

Figure 3:
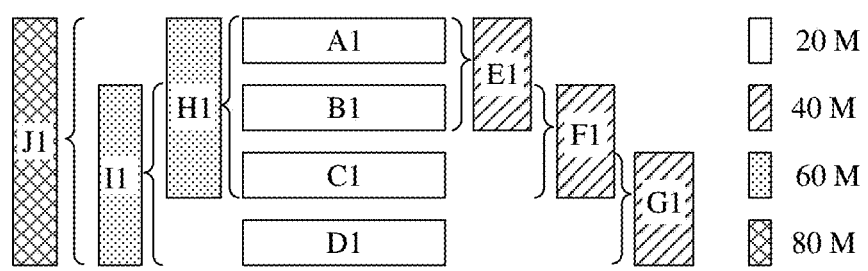
FIG. 3 is a schematic diagram of a location of each BWP in a system bandwidth according to an embodiment of this application.

It is assumed that a supported maximum system bandwidth is 80 MHz, and the maximum system bandwidth may be divided into four 20 MHZ-size BWPs in advance, to implement flexible bandwidth transmission of 20 M, 40 M, 60 M, and 80 M. Table 1 is a schematic table of the identification information of the any BWP. As shown in Table 1, identification information of each BWP is encoded (optionally, a same encoding rule is used in the network device and the terminal device) in advance. For example, identification information A1 (for example, 0000) represents BWP #0, identification information B1 (for example, 0001) represents BWP #1, . . . , and identification information J1 (for example, 1001) represents BWP #9. Locations of BWPs in a system bandwidth are shown in FIG. 3. It should be noted that a location relationship and an encoding manner of each BWP are merely used as an example to describe this solution. Certainly, another encoding manner may be used. This is not limited in this embodiment of this application.

TABLE 1 is a schematic table of the identification
information of the any BWP

| Identification information of the BWP | Number of the BWP |
|---|---|
| A1 | 0 |
| B1 | 1 |
| C1 | 2 |
| D1 | 3 |
| E1 | 4 |
| F1 | 5 |
| G1 | 6 |
| H1 | 7 |
| I1 | 8 |
| J1 | 9 |

Figure 4:
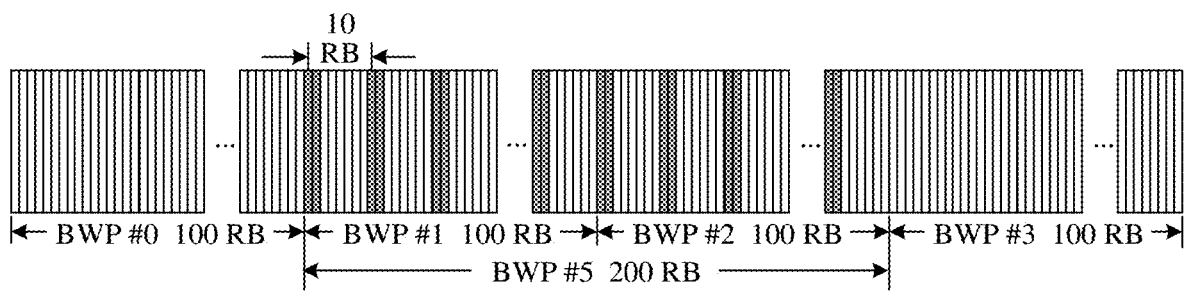
FIG. 4 is a schematic diagram 1 of resource allocation according to an embodiment.

Assuming that a subcarrier spacing is 15 kHz, a transmission bandwidth corresponding to a 20 M system bandwidth is 100 RBs, a transmission bandwidth corresponding to a 40 M system bandwidth is 200 RBs, a transmission bandwidth corresponding to a 60 M system bandwidth is 300 RBs, and a transmission bandwidth corresponding to an 80 M system bandwidth is 400 RBs. A structure in which each IRG includes 10 RBs is used as a basic unit for resource allocation. FIG. 4 is a schematic diagram 1 of resource allocation according to this embodiment. As shown in FIG. 4, it is assumed that the network device determines to allocate two consecutive IRGs on a BWP #5 to the terminal device, in addition, the network device determines that a relative index of an RB in an IRG included in a resource that is allocated to the terminal device and that is in the BWP #5 meets $RB_{start1}+l+i*N$, and $RB_{start1}=0$, $L=2$, $N=10$, and $M_1=20$ ($N_{RB}^{BWP1}=200$ RBs). Further, the network device determines, based on $N(L-1)+RB_{start1}$, that the first RIV is 10. Further, the network device sends the first RIV (namely, 10) and identification information (namely, identification information E1) of the BWP #5 to the terminal device.

Further, the terminal device determines, based on the first RIV, that $RB_{start1}=0$ and $L=2$. Because $RB_{start1}$ is used to indicate a relative start RB index of a resource in a BWP, the terminal device determines, by combining the identification information (namely, bandwidth information) of the BWP #5, an actual location in the system on which the resource allocated by the network device to the terminal device is located. Further, the terminal device determines, based on the identification information of the BWP #5, that the resource allocated by the network device to the terminal device is located in the BWP #5. Therefore, that $RB_{offset1}=100$ and $M_1=\lfloor N_{RB}^{BWP1}/N \rfloor=20$ is determined. Further, the terminal device determines that an RB set included in the resource allocated by the network device to the terminal device is $RB_{start1ac1}+l+i*N$, and $RB_{start1ac1}=100$, l=0 and 1, i=0, 1, . . . , and 19.

Optionally, the terminal device may determine, based on at least the following several implementations, that $RB_{start1}=0$ and $L=2$.

Implementation 1: If $\lfloor RIV1/N \rfloor + RIV \ 1\% \ N < N$, $RB_{start1}=RIV \ 1\% \ N$ and $L=\lfloor RIV/N \rfloor+1$; otherwise, $RB_{start1}=N-RIV \ 1\% \ N-1$ and $L=N-\lfloor RIV1/N \rfloor+1$. RIV1 represents the first RIV.

Implementation 2: The terminal device may determine, based on the first RIV, that $RB_{start1}=0$ and $L=2$ and first preset mapping information. The first preset mapping information includes a mapping relationship between the first RIV and a first location parameter, and the first location parameter includes $RB_{start1}$ and L.

Optionally, for a process in which the terminal device determines, based on the first RIV, that $RB_{start1}=0$ and $L=2$ in this embodiment of this application, refer to a processing process after the terminal device receives downlink control information (Downlink Control Information, DCI) format (format) 1A, DCI format 1B, or DCI format 1D in an LTE system. Details are not described herein again.

Certainly, the process in which the terminal device determines, based on the first RIV, that $RB_{start1}=0$ and $L=2$ may alternatively be another existing manner or a future manner. This is not limited in this embodiment of this application.

In this embodiment of this application, the network device sends the resource indication information to the terminal device. The resource indication information includes the first resource indicator value RIV (used to indicate location information of a resource allocated by the network device to the terminal device in any BWP) and identification information of the any BWP (used to indicate bandwidth information of the any BWP). Further, the terminal device determines, based on the resource indication information, a resource corresponding to the resource indication information, and sends uplink data to the network device on the resource corresponding to the resource indication information. Further, the network device receives, on the resource corresponding to the resource indication information, the uplink data sent by the terminal device. It can be learned that, in this embodiment, the resource indication information sent by the network device to the terminal device is used to indicate both the location information of the resource that is in the any BWP and that is allocated by the network device to the terminal device and the bandwidth information of the any BWP, so that the terminal device can determine, based on the resource indication information, the resource allocated by the network device. Therefore, in this embodiment, the network device may indicate a system bandwidth of any size and/or a resource in any BWP in the system bandwidth to the terminal device, so that the terminal device can perform data transmission on the indicated resource. This implements flexible data transmission.

In a data transmission method provided in another embodiment of this application, based on the foregoing embodiment, an implementation process in which the foregoing resource indication information includes the second resource indicator value RIV (the second RIV is used to indicate the location information, in the at least one BWP, of the resource allocated by the network device to the terminal device) and the bandwidth information of the at least one BWP is described in detail.

It is assumed that a supported maximum system bandwidth is 80 MHz, and the maximum system bandwidth may be divided into four 20 MHZ-size BWPs in advance. Flexible bandwidth transmission of 20 M, 40 M, 60 M, and 80 M can be implemented by combining the four BWPs. Table 2 is a schematic table of the identification information of the at least one BWP. As shown in Table 2, identification information corresponding to a combination of BWPs is separately encoded (optionally, a same encoding rule is used in the network device and the terminal device) in advance. For example, identification information A2 (for example, 0) represents a 20 M bandwidth corresponding to a BWP #0, alternatively, identification information F2 (for example, 5) represents a 40 M bandwidth corresponding to the BWP #0 and a BWP #2. It should be noted that an encoding manner described in Table 2 is merely used as an example to describe this solution. Certainly, another encoding manner may be used. This is not limited in this embodiment of this application.

TABLE 2 is a schematic table of the identification
information of the at least one BWP

| Identification information of the at least one BWP | Number of the at least one BWP |
|---|---|
| A2 | 0 |
| B2 | 1 |
| C2 | 2 |
| D2 | 3 |
| E2 | 0, 1 |
| F2 | 0, 2 |
| G2 | 0, 3 |
| H2 | 1, 2 |
| I2 | 1, 3 |
| J2 | 2, 3 |
| K2 | 0, 1, 2 |
| L2 | 0, 1, 3 |
| M2 | 0, 2, 3 |
| N2 | 1, 2, 3 |
| O2 | 0, 1, 2, 3 |

Figure 5:
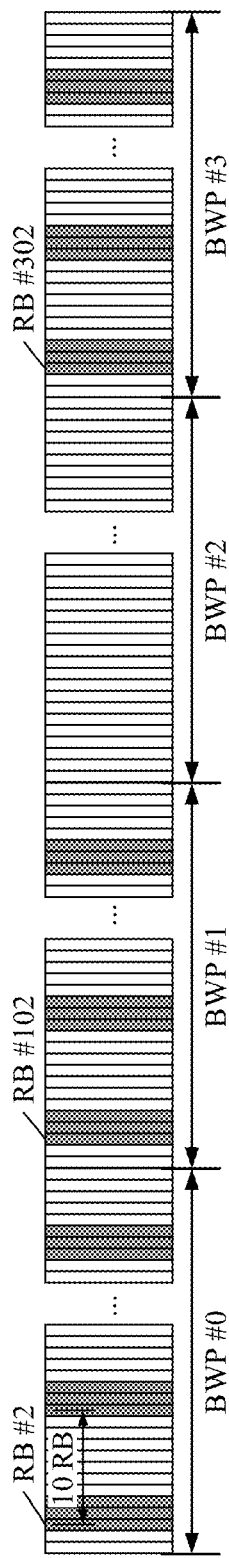
FIG. 5 is a schematic diagram 2 of resource allocation according to an embodiment.

Assuming that a subcarrier spacing is 15 kHz, a transmission bandwidth corresponding to an 80 MHz system bandwidth is 400 RBs. The transmission bandwidth may be divided into four 20 MHz-size BWPs in advance. Each 20 M BWP includes 100 RBs. A structure in which each IRG includes 10 RBs is used as a basic unit for resource allocation. FIG. 5 is a schematic diagram 2 of resource allocation according to this embodiment. As shown in FIG. 5, it is assumed that the network device determines to allocate three consecutive IRGs in the at least one BWP (namely, a 60 M bandwidth corresponding to the BWP #0, a BWP #1, and a BWP #3) corresponding to identification information L2 (for example, 11) to the terminal device. (For example, an IRG 2, an IRG 3, and an IRG 4), and the network device determines $RB_{start2}=2$, $L=3$, $N=10$, and $BWP_{ID}=11$. Further, the network device determines, based on $$N(L-1) + RB_{start2} + BWP_{ID} * \frac{N(N+1)}{2},$$

that the second RIV is 627, and sends the second RIV (namely, 627) to the terminal device.

Further, the terminal device determines, based on the second RIV, that $RB_{start2}=2$, $L=3$, and $BWP_{ID}=11$. Because $RB_{start2}$ is used to indicate a relative start RB index of a resource in a BWP, the terminal device determines, by combining $BWP_{ID}$ (namely, the bandwidth information of the at least one BWP), an actual location in the system on which the resource allocated by the network device to the terminal device is located. Further, the terminal device determines, based on $BWP_{ID}$, that the resource allocated by the network device to the terminal device is located on the 60 M bandwidth corresponding to the BWP #0, the BWP #1, and the BWP #3. Therefore, that $RB_{offset2}$ of the BWP #0=0, $RB_{offset2}$ of the BWP #1=100, and $RB_{offset2}$ of the BWP #3=300 is determined. Further, the terminal device determines that an RB set in an IRG included in the resource allocated by the network device to the terminal device is $RB_{start2ac2}+1+i*N$, and $RB_{start2ac2}=2$, 102, and 302, l=0, 1, and 2, and i=0, 1, ..., and 9.

Optionally, the terminal device may first determine, based on the second RIV, that $BWP_{ID}=11$, and then determine $RB_{start2}=2$ and $L=3$. Optionally, the terminal device may determine, in the at least the following implementations based on the second RIV, that $$BWP_{ID} = 11: BWP_{ID} = \left\lfloor RIV2 \Big/ \left(\frac{N(N+1)}{2}\right)\right\rfloor,$$

and RIV2 represents the second RIV, and $\lfloor \ \rfloor$ represents rounding down. Certainly, the process in which the terminal device determines, based on the second RIV, that $BWP_{ID}=11$ may alternatively be another existing manner or a future manner. This is not limited in this embodiment of this application.

Optionally, for a process in which the terminal device determines, based on the second RIV, that $RB_{start2}=2$ and L=3 in this embodiment of this application, refer to the foregoing process in which "the terminal device determines, based on the first RIV, that $RB_{start1}=0$ and L=2". Details are not described herein again. Certainly, the process in which the terminal device determines, based on the second RIV, that $RB_{start2}=2$ and L=3 may alternatively be another existing manner or a future manner. This is not limited in this embodiment of this application.

In this embodiment, the network device sends the resource indication information to the terminal device. The resource indication information includes the second resource indicator value RIV (used to indicate location information of a resource allocated by the network device to the terminal device in at least one BWP and bandwidth information of the at least one BWP). Further, the terminal device determines, based on the resource indication information, a resource corresponding to the resource indication information, and sends uplink data to the network device on the resource corresponding to the resource indication information. Further, the network device receives, on the resource corresponding to the resource indication information, the uplink data sent by the terminal device. It can be learned that in this embodiment, the resource indication information sent by the network device to the terminal device is used to indicate both the location information of the resource that is in the at least one BWP and that is allocated by the network device to the terminal device and the bandwidth information of the at least one BWP, so that the terminal device can determine, based on the resource indication information, the resource allocated by the network device. Therefore, in this embodiment, the network device may indicate a system bandwidth of any size and/or a resource in any BWP in the system bandwidth to the terminal device, so that the terminal device can perform data transmission on the indicated resource. This implements flexible data transmission.

In a data transmission method provided in another embodiment of this application, based on the foregoing embodiment, an implementation process in which the network device sends, to the terminal device in a preset sequence, the resource indication information corresponding to each BWP in the system bandwidth (the resource indication information corresponding to each BWP is used to indicate location information of a resource in the BWP, and a sending sequence of the resource indication information corresponding to each BWP is corresponds to location information of the BWP in the system bandwidth) is described in detail.

Figure 6:
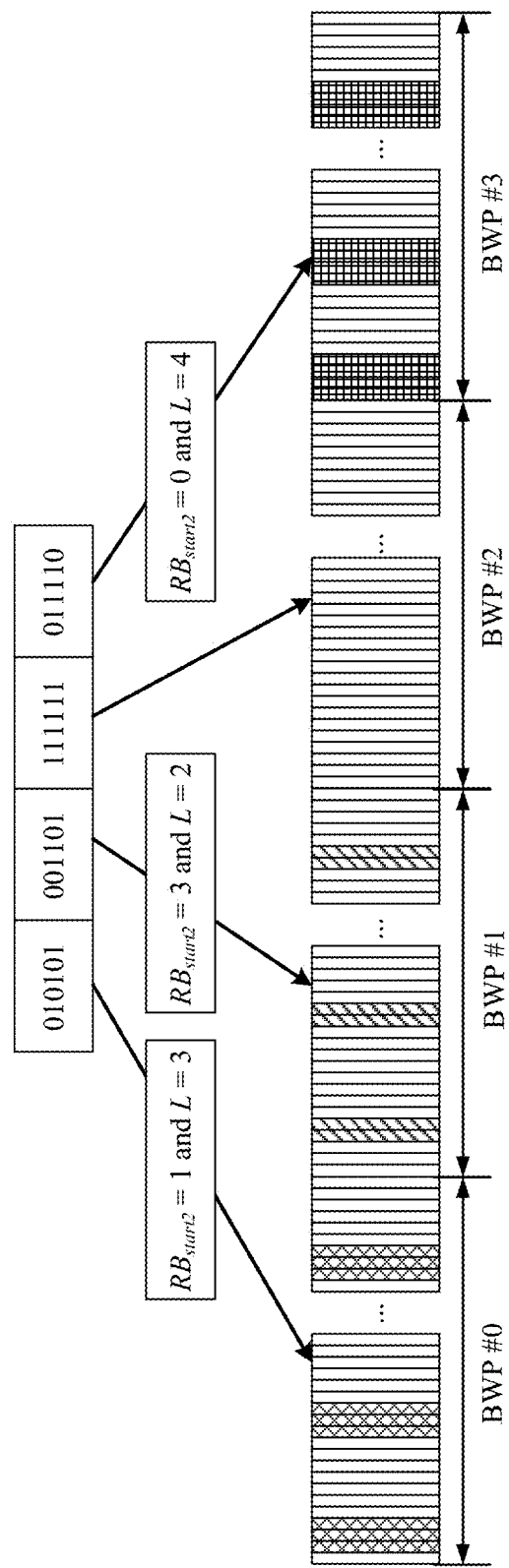
FIG. 6 is a schematic diagram 3 of resource allocation according to an embodiment.

Assuming that a subcarrier spacing is 15 kHz, a transmission bandwidth corresponding to an 80 MHz system bandwidth is 400 RBs. The transmission bandwidth may be divided into four 20 MHz-size BWPs (such as a BWP #0, a BWP #1, a BWP #2, and a BWP #3) in advance. Each 20 M BWP includes 100 RBs. A structure in which each IRG includes 10 RBs is used as a basic unit for resource allocation. FIG. 6 is a schematic diagram 3 of resource allocation according to this embodiment. As shown in FIG. 6, it is assumed that the network device determines to allocate an IRG 1 to an IRG 3 in the BWP #0, an IRG 3 to an IRG 4 in the BWP #1, and an IRG 0 to an IRG 3 in the BWP #3 to the terminal device, and the network device determines that $RB_{start2}$ in the BWP #0=1 and L in the BWP #0=3, $RB_{start2}$ in the BWP #1=3 and L in the BWP #1=2, and $RB_{start2}$ in the BWP #3=0 and L in the BWP #3=4. Further, the network device determines, based on $RB_{start2}$ in the BWP #0=1 and L in the BWP #0=3 and $N(L-1)+RB_{start2}$, that a third RIV corresponding to the BWP #0 is 21 (namely, 010101 in binary), determines, based on $RB_{start2}$ in the BWP #1=3 and L in the BWP #1=2 and $N(L-1)+RB_{start2}$, that a third RIV corresponding to the BWP #1 is 13 (namely, 001101 in binary), determines, based on $RB_{start2}$ in the BWP #3=0 and L in the BWP #3=4 and $N(L-1)+RB_{start2}$, that a third RIV corresponding to the BWP #3 is 30 (namely, 011110 in binary), and determines that a third RIV corresponding to the BWP #2 that does not allocate a resource to the terminal device is a preset value (for example, 111111 in binary). Further, the network device sequentially sends, to the terminal device in sequence, the third RIV corresponding to the BWP #0, the third RIV corresponding to the BWP #1, the third RIV corresponding to the BWP #2, and the third RIV corresponding to the BWP #3.

Further, the terminal device determines example $RB_{start2}$ and L (for example, $RB_{start2}$ in the BWP #0=1 and L in the BWP #0=3, $RB_{start2}$ in the BWP #1=3 and L in the BWP #1=2, and $RB_{start2}$ in the BWP #3=0 and L in the BWP #3=4) on a corresponding BWP based on the third RIV corresponding to each BWP and a receiving sequence of the third RIV corresponding to each BWP. Because the third RIV corresponding to the BWP #2 is the preset value, it is determined that the network device does not allocate a resource to the terminal device in the BWP #2. Further, (a): The terminal device determines that an RB set in an IRG included in a resource allocated by the network device to the terminal device in the BWP #0 is $RB_{start2}+l+i*N$, and $RB_{start2}32$ 1, l=0, 1, and 2, and i=0, 1, . . . , and 9; (b): The terminal device determines that an RB set in an IRG included in a resource allocated by the network device to the terminal device in the BWP #1 is $RB_{start2}+l+i*N$, and $RB_{start2}=3$, l=0 and 1, i=0, 1, . . . , and 9; and (c): The terminal device determines that an RB set in an IRG included in a resource allocated by the network device to the terminal device in the BWP #3 is $RB_{start2}+l+i*N$, and $RB_{start2}0$, l=0, 1, 2, and 3, and i=0, 1, . . . , and 9.

For a process in which the terminal device determines $RB_{start2}$ and L of the corresponding BWP based on the third RIV corresponding to each BWP in this embodiment of this application, refer to the foregoing process in which "the terminal device determines, based on the first RIV, that $RB_{start1}=0$ and L=2". Details are not described herein again. Certainly, the process in which the terminal device determines $RB_{start2}$ and L of the corresponding BWP based on the third RIV corresponding to each BWP may alternatively be another existing manner or a future manner. This is not limited in this embodiment of this application.

In this embodiment, the network device sends, to the terminal device in the preset sequence, the resource indication information corresponding to each BWP in the system bandwidth (the resource indication information corresponding to each BWP is used to indicate location information of a resource in the BWP, and a sending sequence of the resource indication information corresponding to each BWP corresponds to the location information of the BWP in the system bandwidth). Further, the terminal device determines, based on the resource indication information corresponding to each BWP and a receiving sequence of the resource indication information corresponding to each BWP, the resource corresponding to the resource indication information corresponding to each BWP, and sends the uplink data to the network device on the resource corresponding to the resource indication information corresponding to each BWP. Further, the network device receives, on the resource corresponding to the resource indication information, the uplink data sent by the terminal device. It can be learned that, in this embodiment, the resource indication information that is sent by the network device to the terminal device and that corresponds to each BWP is used to indicate both the location information of the resource in the BWP and the bandwidth information of the BWP, so that the terminal device can determine, based on the resource indication information corresponding to each BWP, the resource allocated by the network device. Therefore, in this embodiment, the network device may indicate a system bandwidth of any size and/or a resource in any BWP in the system bandwidth to the terminal device, so that the terminal device can perform data transmission on the indicated resource. This implements flexible data transmission.

In a data transmission method provided in another embodiment of this application, the foregoing resource indication information includes a fourth resource indicator value RIV. Optionally, quantity information of the at least one BWP is further included. It may be understood that when an allocated bandwidth is a default initial access bandwidth of the terminal device, or the terminal device may learn of bandwidth information by using other signaling, and the resource indication information does not include the quantity information of the BWP. The fourth RIV is used to indicate location information of a resource in a bandwidth allocated by the network device to the terminal device. If the resource indication information includes the quantity information of the at least one BWP, the allocated bandwidth may be obtained by using the quantity information. Otherwise, the terminal device may obtain the allocated bandwidth in another manner, for example, the default initial access bandwidth. This is not limited in this application.

Optionally, the network device determines the fourth RIV based on the following manner.

If $L-1 \leq \lfloor N/2 \rfloor$, fourth $RIV=N(L-1)+IRG_{start}$, and otherwise, fourth $RIV=N(N-L+1)+(N-1-IRG_{start})$. $IRG_{start}$ is a start interlaced resource block group IRG index, L is a quantity of IRGs allocated to the terminal device, and N is a total quantity of IRGs that can be allocated.

It is assumed that a bandwidth allocated to a terminal device is 60 MHz, and corresponds to three 20 M-size BWPs (such as a BWP #0, a BWP #1, and a BWP #2). A structure in which each IRG includes 10 RBs is used as a basic unit for resource allocation, and all IRGs are sequentially and globally indexed based on a BWP, in other words, a global index corresponding to a $0^{th}$ IRG in the BWP #0 is 0, a global index corresponding to a $0^{th}$ IRG in the BWP #1 is 1, and a global index corresponding to a $0^{th}$ IRG in the BWP #2 is 2. Then, a global index corresponding to a first IRG in the BWP #0 is 3, a global index corresponding to a first IRG in the BWP #1 is 4, a global index corresponding to a first IRG in the BWP #2 is 5, and so on.

Figure 14:
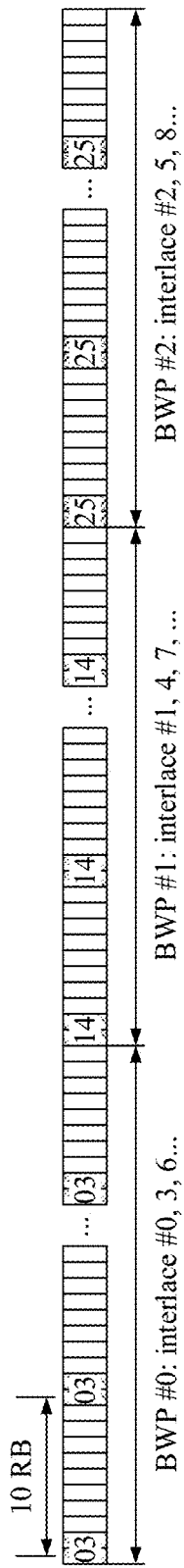
FIG. 14 is a schematic diagram of resource allocation according to an embodiment of this application.

FIG. 14 is a schematic diagram of resource allocation according to this embodiment. It is assumed that the network device allocates IRGs #0 to 5 to the terminal device, and correspondingly, $IRG_{start}=0$, L=6, N=30, and the fourth RIV=30×5=150, in other words, the network device indicates that the fourth RIV=150 to the terminal device. Correspondingly, after receiving the fourth RIV, the terminal device may learn that $IRG_{start}=0$, L=6.

For a process in which the terminal device determines $IRG_{start}$ and L of the corresponding BWP based on the fourth RIV in this embodiment of this application, refer to the foregoing process in which "the terminal device determines, based on the first RIV, that $RB_{start1}=0$ and L=2". Details are not described herein again. Certainly, the process in which the terminal device determines the IRG index $IRG_{start}$ and L based on the fourth RIV may alternatively be another existing manner or a future manner. This is not limited in this embodiment of this application.

In this embodiment of this application, the network device sends the resource indication information to the terminal device. The resource indication information includes the fourth resource indicator value RIV (used to indicate location information of a resource in any one or more BWPs allocated by the network device to the terminal device). The terminal device determines, based on the resource indication information, a resource corresponding to the resource indication information, and sends the uplink data to the network device on the resource corresponding to the resource indication information. Further, the network device receives, on the resource corresponding to the resource indication information, the uplink data sent by the terminal device. It can be learned that in this embodiment, the resource instruction information sent by the network device to the terminal device may complete resource indication on a plurality of BWPs by using a single RIV. This simplifies resource indication and improves efficiency.

In a data transmission method provided in another embodiment of this application, based on the foregoing embodiment, an implementation process in which the foregoing resource indication information includes a combinatorial index value and quantity information of at least one BWP (the combinatorial index value is used to indicate location information of a resource in each of the at least one BWP allocated by the network device to the terminal device, and the quantity information of the at least one BWP is used to indicate bandwidth information of the at least one BWP) is described in detail.

Figure 7:
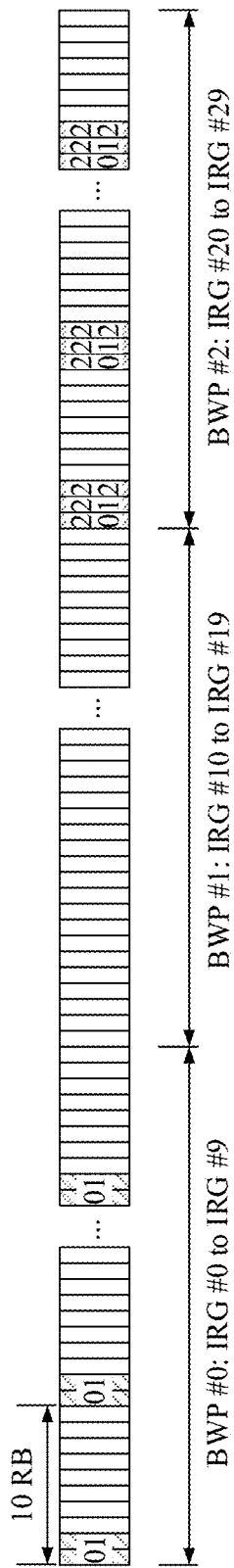
FIG. 7 is a schematic diagram 4 of resource allocation according to an embodiment.

It is assumed that a transmission bandwidth corresponding to a 60 MHz system bandwidth may be divided into three 20 M-size BWPs (such as a BWP #0, a BWP #1, and a BWP #2) in advance, a structure in which each IRG includes 10 RBs is used as a basic unit for resource allocation, and all IRGs are indexed together. In other words, indexes of 10 IRGs in the BWP #0 are respectively 0 to 9, indexes of 10 IRGs in the BWP #1 are respectively 10 to 19, and indexes of 10 IRGs in the BWP #2 are respectively 20 to 29. FIG. 7 is a schematic diagram 4 of resource allocation according to this embodiment. As shown in FIG. 7, it is assumed that the network device determines to allocate, to the terminal device, a resource corresponding to a start IRG index 0 and an end IRG index 1 in the BWP #0 and a resource corresponding to a start IRG index 20 and an end IRG index 22 in the BWP #2, and the network device determines that the start IRG index in the BWP #0 $s_0=0$ and the end IRG index in the BWP #0 $s_1=1$, and the start IRG index in the BWP #2 $s_2=20$ and the end IRG index in the BWP #2 $s_3=22$, and K1=4 ($N_{BWP}$=2), and P1=30. Further, the network device determines that the combinatorial index value r1=31112 based on $$r1 = \sum_{k1=0}^{K1-1} \binom{P1-s_{k1}}{K1-k1} = \binom{30}{4} + \binom{29}{3} + \binom{10}{2} + \binom{8}{1},$$

and sends the combinatorial index value r1 and $N_{BWP}$ (or K1) to the terminal device.

Further, the terminal device determines, based on the combinatorial index value r1 and $N_{BWP}$ (or K1), that $s_0$=0, $s_1$=1, $s_2$=20, and $s_3$=22. In this way, a resource (for example, the resource corresponding to the start IRG index in the BWP #0 $s_0$=0 and the end IRG index in the BWP #0 $s_1$=1, and a frequency domain corresponding to the start IRG index in the BWP #2 $s_2$=20 and the end IRG index in the BWP #2 $s_3$=22) allocated by the network device to the terminal device is determined.

Optionally, the terminal device may determine, in at least the following implementations based on the combinatorial index value r1 and $N_{BWP}$ (or K1), that $s_0$=0, $s_1$=1, $s_2$=20, and $s_3$=22.

Optionally, the terminal device may determine, based on the combinatorial index value r1, $N_{BWP}$, and second preset mapping information, that $s_0$=0, $s_1$=1, $s_2$=20, and $s_3$=22. The second preset mapping information includes a mapping relationship between the resource indication information (including the combinatorial index value r1 and $N_{BWP}$) and a second location parameter, and the second location parameter includes $s_0$, $s_1$, $s_2$, and $s_3$.

Optionally, for a process in which the terminal device determines, based on the combinatorial index value r1 and $N_{BWP}$ (or K1), that $s_0$=0, $s_1$=1, $s_2$=20, and $s_3$=22 in this embodiment of this application, refer to "Huawei. R1-080182: Labelling of UE-selected subbands on PUSCH (3GPP TSG RAN WG1, meeting 51bis, Sevilla, Spain, January 2008)", related documents of a combinatorial index (combinatorial index), or related content in "https://en.wikipedia.org/wiki/Combinatorial_number_system". Details are not described herein again.

Certainly, the process in which the terminal device determines, based on the combinatorial index value r1 and $N_{BSP}$ (or K1), that $s_0$=0, $s_1$=1, $s_2$=20, and $s_3$=22 may alternatively be another existing manner or a future manner. This is not limited in this embodiment of this application.

In this embodiment of this application, the network device sends the resource indication information to the terminal device. The resource indication information includes the combinatorial index value (the combinatorial index value is used to indicate the location information of the resource that is in each of the at least one BWP and that is allocated by the network device to the terminal device) and the quantity information of the at least one BWP (the quantity information of the at least one BWP is used to indicate the bandwidth information of the at least one BWP). Further, the terminal device determines, based on the resource indication information, the resource corresponding to the resource indication information, and sends the uplink data to the network device on the resource corresponding to the resource indication information. Further, the network device receives, on the resource corresponding to the resource indication information, the uplink data sent by the terminal device. It can be learned that in this embodiment, the resource indication information sent by the network device to the terminal device is used to indicate both the location information of the resource that is in the at least one BWP and that is allocated by the network device to the terminal device and the bandwidth information of the at least one BWP, so that the terminal device can determine, based on the resource indication information, the resource allocated by the network device. Therefore, in this embodiment, the network device may indicate a system bandwidth of any size and/or a resource in any BWP in the system bandwidth to the terminal device, so that the terminal device can perform data transmission on the indicated resource. This implements flexible data transmission.

Figure 8:
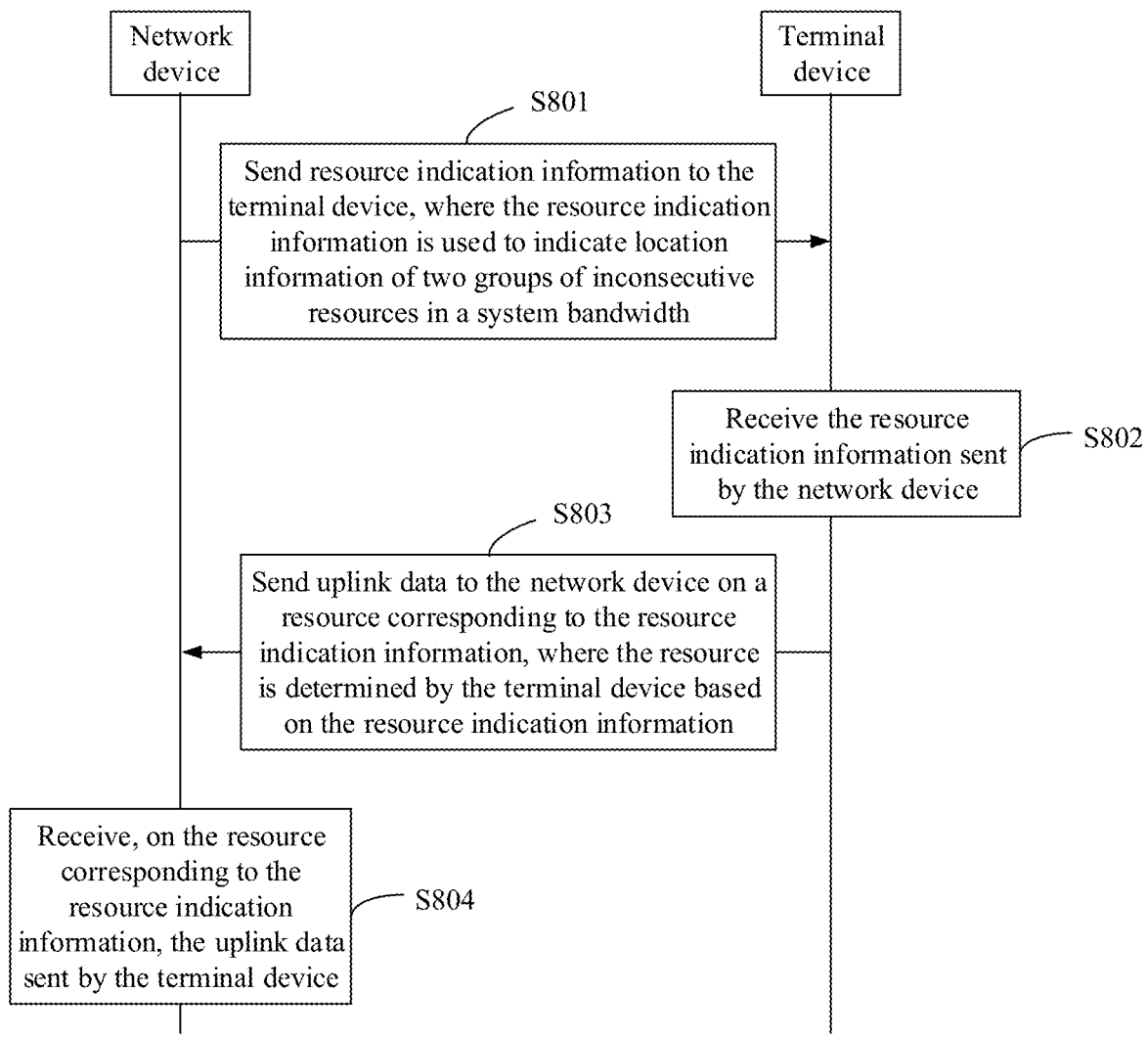
FIG. 8 is a schematic flowchart of a data transmission method according to another embodiment of this application.

FIG. 8 is a schematic flowchart of a data transmission method according to another embodiment of this application. As shown in FIG. 8, the method in this embodiment of this application may include the following steps.

Step S801: A network device sends resource indication information to a terminal device, where the resource indication information is used to indicate location information of two groups of inconsecutive resources on a system bandwidth.

In this embodiment, optionally, after determining a resource allocated to the terminal device, the network device sends the resource indication information (used to indicate the location information of the two groups of inconsecutive resources in the system bandwidth) to the terminal device, so that the terminal device can determine, based on the resource indication information, the resource allocated by the network device to the terminal device. For example, that the network device determines the resource allocated to the terminal device includes: a resource A (including one or more IRGs) located on the system bandwidth and a resource C (including one or more IRGs) on the system bandwidth, and the resource indication information is used to indicate location information of the resource A and the resource C on the system bandwidth.

Optionally, the network device may allocate a resource in the system bandwidth to the terminal device based on parameters such as a service requirement of the terminal device and an LBT result. Certainly, the network device may alternatively determine, in another manner, the resource allocated to the terminal device. This is not limited in this embodiment of this application.

Optionally, the resource indication information includes a combinatorial index value, and the combinatorial index value is used to indicate location information of each group of the two groups of inconsecutive resources. Optionally, the combinatorial index value is determined by the network device based on a start interlaced resource block group IRG index and an end IRG index of each group of resources in the system bandwidth.

In this embodiment, optionally, the network device determines to allocate the two groups of inconsecutive resources (for example, the resource A and the resource C) on the system bandwidth to the terminal device, and determines the combinatorial index value based on the location information of each group of resources. Further, the network device sends the resource indication information to the terminal device, so that the terminal device determines, based on the resource indication information, the resource (for example, the resource A and the resource C) allocated by the network device. The resource indication information includes the combinatorial index value used to indicate the location information of each group of resources (for example, the resource A or the resource C).

Optionally, the network device determines the location information (for example, the start interlaced resource block group IRG index and the end IRG index of each group of resources in the system bandwidth) of each resource in the two groups of inconsecutive resources allocated to the terminal device. Further, the network device determines, based on the start interlaced resource block group IRG index and the end IRG index (for example, a start IRG index and an end IRG index of the resource A on the system bandwidth, and a start IRG index and an end IRG index of the resource C on the system bandwidth) of each group of resources in the system bandwidth, the combinatorial index value.

Optionally, the network device may determine, in at least the following manners based on the start interlaced resource block group IRG index and the end IRG index of each group of resources in the system bandwidth, the combinatorial index value.

For ease of description, it is assumed that a start IRG index and an end IRG index of a first group of resources (for example, a resource A) in the two groups of inconsecutive resources in the system bandwidth are respectively $s_0$ and $s_1-1$, and a start IRG index and an end IRG index of a second group of resources (for example, a resource C) on the system bandwidth are respectively $s_2$ and $s_3-1$, and $s_0 \leq s_1-1 \leq s_2 \leq s_3-1$. Therefore, a manner of calculating the combinatorial index value is as follows:

The combinatorial index value $$r2 = \sum_{k2=0}^{K2-1} \binom{P2 - s_{k2}}{K2 - k2},$$

K2=4 and P2=N+1, and N represents a quantity of RBs spaced by two adjacent RBs in each IRG.

Certainly, the network device may further determine the combinatorial index value in another manner. This is not limited in this embodiment of this application.

Certainly, the resource indication information sent by the network device to the terminal device in this embodiment may further include another possible implementation. This is not limited in this embodiment of this application.

Step S802: The terminal device receives the resource indication information sent by the network device.

In this embodiment, the terminal device receives the resource indication information sent by the network device. The resource indication information is used to indicate the location information of the two groups of inconsecutive resources in the system bandwidth.

For an implementation of the resource indication information, refer to related content in step S801. Details are not described again in this embodiment.

Step S803: The terminal device sends uplink data to the network device on a resource corresponding to the resource indication information, where the resource is determined by the terminal device based on the resource indication information.

In this embodiment, optionally, after receiving the resource indication information sent by the network device, the terminal device determines, based on the resource indication information, a resource (for example, the resource A and the resource C) allocated by the network device to the terminal device. Further, the terminal device sends the uplink data to the network device on the resource (namely, the resource allocated by the network device to the terminal device, for example, the resource A and the resource C) corresponding to the resource indication information.

Optionally, the resource indication information includes the combinatorial index value, and the combinatorial index value is used to indicate the location information of each resource in the two groups of inconsecutive resources. Correspondingly, the terminal device determines the location information (for example, the start IRG index $s_0$, the end IRG index $s_1-1$, the start IRG index $s_2$, and the end IRG index $s_3-1$) of each group of resources in the system bandwidth based on the combinatorial index value, in other words, the resource (for example, the resource A and the resource C) allocated by the network device to the terminal device is determined.

Certainly, the terminal device may alternatively determine, in another possible implementation based on the resource indication information, the resource allocated by the network device to the terminal device. This is not limited in this embodiment of this application.

Step S804: The network device receives, on a resource corresponding to the resource indication information, the uplink data sent by the terminal device.

In this embodiment, the network device sends the resource indication information to the terminal device. The resource indication information is used to indicate the location information of the two groups of inconsecutive resources in the system bandwidth. Further, after receiving the resource indication information sent by the network device, the terminal device sends the uplink data to the network device on the resource corresponding to the resource indication information. Further, the network device receives, on the resource corresponding to the resource indication information, the uplink data sent by the terminal device. It can be learned that in this embodiment, the network device sends the resource indication information (used to indicate location information of any two groups of inconsecutive resources in the system bandwidth) to the terminal device, so that the terminal device can determine, based on the resource indication information, the resource allocated by the network device. Therefore, data transmission can be performed on any two groups of indicated inconsecutive resources.

In a data transmission method provided in another embodiment of this application, based on the foregoing embodiment, an implementation process in which the resource indication information includes the combinatorial index value (the combinatorial index value is used to indicate the location information of each group of the two groups of inconsecutive resources allocated by the network device to the terminal device) is described in detail.

Figure 9:
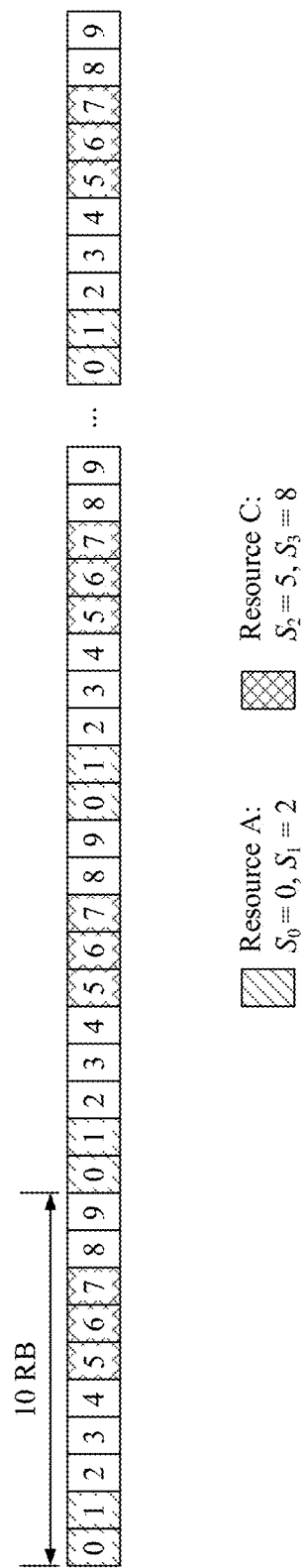
FIG. 9 is a schematic diagram 5 of resource allocation according to an embodiment.

Assuming that a subcarrier spacing is 15 kHz, a transmission bandwidth corresponding to a 40 M system bandwidth is 200 RBs. A structure in which each IRG includes 10 RBs is used as a basic unit for resource allocation. FIG. 9 is a schematic diagram 5 of resource allocation according to this embodiment. As shown in FIG. 9, it is assumed that the network device determines to allocate the resource A (namely, $s_0=0$ and $s_1=2$) whose start IRG index is 0 and end IRG index is 1 and the resource C (namely, $s_2=5$ and $s_3=8$) whose start IRG index is 5 and end IRG index is 7 to the terminal device. Further, the network device determines, based on $$r2 = \sum_{k2=0}^{K2-1} \binom{P2 - s_{k2}}{K2 - k2} = \binom{11}{4} + \binom{9}{3} + \binom{6}{2} + \binom{3}{1},$$

that the combinatorial index value r2=432 (K1=4 and P2=10+1=11), and sends the combinatorial index value r2 to the terminal device.

Further, the terminal device determines, based on the combinatorial index value r2, that $s_0=0$, $s_1=2$, $s_2=5$, and $s_3=8$, to determine the resource (for example, the resource A and the resource C) allocated by the network device to the terminal device.

Optionally, for a process in which the terminal device determines, based on the combinatorial index value r2, that $s_0=0$, $s_1=2$, $s_2=5$, and $s_3=8$ in this embodiment of this application, refer to the foregoing process in which "the terminal device determines, based on the combinatorial index value r1 and $N_{BWP}$, that $s_0=0$, $s_1=1$, $s_2=20$, and $s_3=22$". Details are not described herein again. Certainly, the process in which the terminal device determines, based on the combinatorial index value r2, that $s_0=0$, $s_1=2$, $s_2=5$, and $s_3=8$ may alternatively be another existing manner or a future manner. This is not limited in this embodiment of this application.

In this embodiment, the network device sends the resource indication information to the terminal device. The resource indication information includes the combinatorial index value (used to indicate the location information of each group of the two groups of inconsecutive resources allocated by the network device to the terminal device). Further, the terminal device determines, based on the resource indication information, a resource corresponding to the resource indication information, and sends the uplink data to the network device on the resource corresponding to the resource indication information. Further, the network device receives, on the resource corresponding to the resource indication information, the uplink data sent by the terminal device. It can be learned that in this embodiment, the network device sends the resource indication information (used to indicate location information of any two groups of inconsecutive resources in the system bandwidth) to the terminal device, so that the terminal device can determine, based on the resource indication information, the resource allocated by the network device. Therefore, data transmission can be performed on any two groups of indicated inconsecutive resources.

Figure 10:
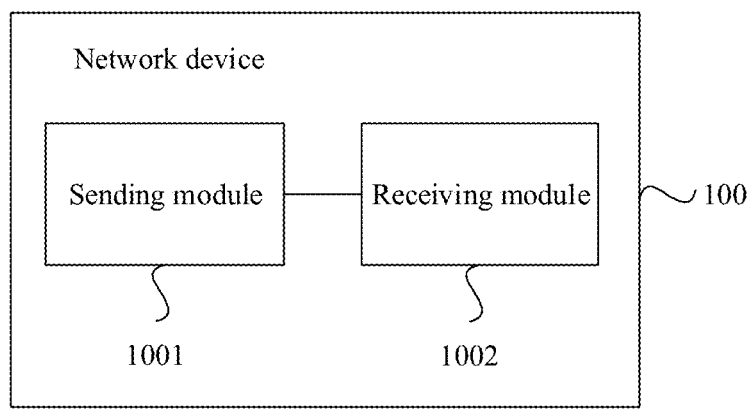
FIG. 10 is a schematic structural diagram of a network device according to an embodiment of this application.

FIG. 10 is a schematic structural diagram of a network device according to an embodiment of this application. As shown in FIG. 10, a network device 100 provided in this embodiment includes a sending module 1001 and a receiving module 1002.

The sending module 1001 is configured to send resource indication information to a terminal device, where the resource indication information is used to indicate location information of a resource in at least one bandwidth subset BWP in a system bandwidth and bandwidth information of the at least one BWP.

The receiving module 1002 is configured to receive, on a resource corresponding to the resource indication information, uplink data sent by the terminal device.

Optionally, the resource indication information includes a first resource indicator value and identification information of any BWP. The first RIV is used to indicate location information of a resource in the any BWP, and the identification information of the any BWP is used to indicate bandwidth information of the any BWP.

Optionally, the first RIV is determined by the network device based on a relative start resource block RB index of the resource in the any BWP and a quantity of interlaced resource block groups IRGs included in the resource.

Optionally, the resource indication information includes a second resource indicator value RIV. The second RIV is used to indicate the location information of the resource in the at least one BWP and the bandwidth information of the at least one BWP.

Optionally, the second RIV is determined by the network device based on a relative start resource block RB index, of a resource in each BWP, in the BWP, a quantity of interlaced resource block groups IRGs included in the resource in each BWP, and the bandwidth information of the at least one BWP.

Optionally, the bandwidth information of the at least one BWP includes identification information of the at least one BWP.

Optionally, the sending module 1001 is specifically configured to:

send, to the terminal device in a preset sequence, resource indication information corresponding to each BWP in the system bandwidth, where the resource indication information corresponding to each BWP is used to indicate location information of a resource in the BWP, a sending sequence of the resource indication information corresponding to each BWP corresponds to location information of the BWP in the system bandwidth, and the bandwidth information of the at least one BWP includes location information of the at least one BWP in the system bandwidth.

Optionally, the resource indication information corresponding to each BWP includes a third RIV corresponding to the BWP, and the third RIV corresponding to the BWP is determined by the network device based on a relative start resource block RB index, of the resource in the BWP, in the BWP and a quantity of interlaced resource block groups IRGs included in the resource in the BWP.

Optionally, if the network device does not allocate a resource to the terminal device in any BWP in the system bandwidth, resource indication information corresponding to the any BWP is preset resource indication information. The preset resource indication information is used to indicate that the resource allocated by the network device to the terminal device in the any BWP is empty.

Optionally, the resource indication information includes a combinatorial index value and quantity information of the at least one BWP. The combinatorial index value is used to indicate the location information of the resource in each BWP, and the quantity information of the at least one BWP is used to indicate the bandwidth information of the at least one BWP.

Optionally, the combinatorial index value is determined by the network device based on a start interlaced resource block group IRG index and an end IRG index, of the resource in each BWP, in the BWP and the quantity information of the at least one BWP.

The network device in this embodiment may be configured to execute the technical solutions provided in the foregoing corresponding data transmission method embodiment of this application. Implementation principles and technical effects thereof are similar. Details are not described herein again.

Figure 11:
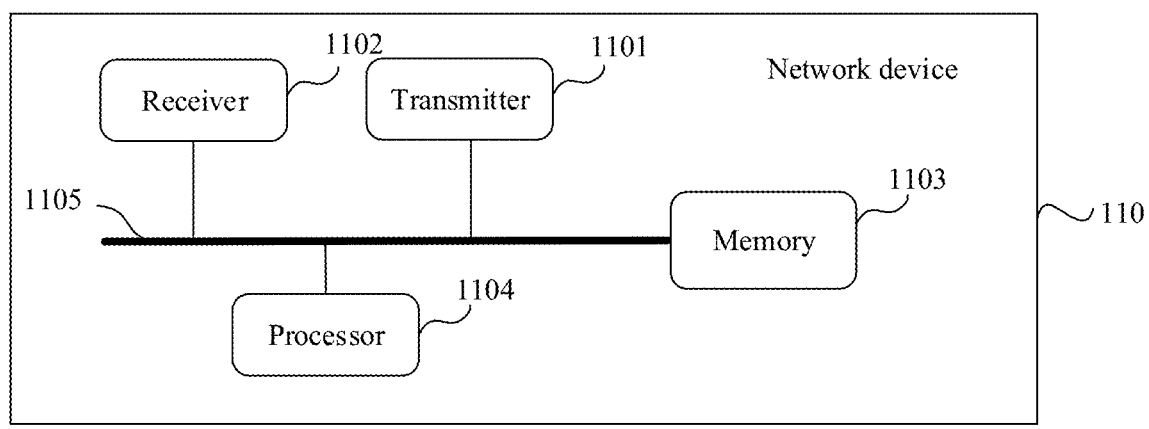
FIG. 11 is a schematic structural diagram of a network device according to another embodiment of this application.

FIG. 11 is a schematic structural diagram of a network device according to another embodiment of this application. As shown in FIG. 11, a network device 110 provided in this embodiment includes a transmitter 1101 and a receiver 1102. Optionally, the network device 110 may further include a memory 1103, a processor 1104, and at least one communications bus 1105.

The communications bus 1105 is configured to implement a communications connection between elements. The memory 1103 may include a high-speed RAM memory, or may include a nonvolatile memory NVM, for example, at least one magnetic disk memory. The memory 1103 may store various program instructions used to perform various processing functions and implement the method steps in the foregoing embodiments of this application. The processor 1104 is configured to invoke the program instruction in the memory 1103, to implement the method steps in the foregoing embodiments of this application by using the transmitter 1101 and/or the receiver 1102. The transmitter 1101 may be a corresponding output interface that has a communication function and an information sending function. The receiver 1102 may be a corresponding input interface that has a communication function and an information receiving function. Optionally, the transmitter 1101 and the receiver 1102 may be integrated into one communications interface, or may be two separate communications interfaces.

Optionally, the transmitter 1101 is configured to send resource indication information to a terminal device, where the resource indication information is used to indicate location information of a resource in at least one bandwidth subset BWP in a system bandwidth and bandwidth information of the at least one BWP.

The receiver 1102 is configured to receive, on a resource corresponding to the resource indication information, uplink data sent by the terminal device.

Optionally, the resource indication information includes a first resource indicator value and identification information of any BWP. The first RIV is used to indicate location information of a resource in the any BWP, and the identification information of the any BWP is used to indicate bandwidth information of the any BWP.

Optionally, the first RIV is determined by the network device based on a relative start resource block RB index of the resource in the any BWP and a quantity of interlaced resource block groups IRGs included in the resource.

Optionally, the resource indication information includes a second resource indicator value RIV. The second RIV is used to indicate the location information of the resource in the at least one BWP and the bandwidth information of the at least one BWP.

Optionally, the second RIV is determined by the network device based on a relative start resource block RB index, of a resource in each BWP, in the BWP, a quantity of interlaced resource block groups IRGs included in the resource in each BWP, and the bandwidth information of the at least one BWP.

Optionally, the bandwidth information of the at least one BWP includes identification information of the at least one BWP.

Optionally, the transmitter 1101 is specifically configured to:
send, to the terminal device in a preset sequence, resource indication information corresponding to each BWP in the system bandwidth, where the resource indication information corresponding to each BWP is used to indicate location information of a resource in the BWP, a sending sequence of the resource indication information corresponding to each BWP corresponds to location information of the BWP in the system bandwidth, and the bandwidth information of the at least one BWP includes location information of the at least one BWP in the system bandwidth.

Optionally, the resource indication information corresponding to each BWP includes a third RIV corresponding to the BWP, and the third RIV corresponding to the BWP is determined by the network device based on a relative start resource block RB index, of the resource in the BWP, in the BWP and a quantity of interlaced resource block groups IRGs included in the resource in the BWP.

Optionally, if the network device does not allocate a resource to the terminal device in any BWP in the system bandwidth, resource indication information corresponding to the any BWP is preset resource indication information. The preset resource indication information is used to indicate that the resource allocated by the network device to the terminal device in the any BWP is empty.

Optionally, the resource indication information includes a combinatorial index value and quantity information of the at least one BWP. The combinatorial index value is used to indicate the location information of the resource in each BWP, and the quantity information of the at least one BWP is used to indicate the bandwidth information of the at least one BWP.

Optionally, the combinatorial index value is determined by the network device based on a start interlaced resource block group IRG index and an end IRG index, of the resource in each BWP, in the BWP and the quantity information of the at least one BWP.

The network device in this embodiment may be configured to execute the technical solutions provided in the foregoing corresponding data transmission method embodiment of this application. Implementation principles and technical effects thereof are similar. Details are not described herein again.

It may be understood that, FIG. 11 merely shows a simplified design of the network device. In another implementation, the network device may include any quantity of transmitters, receivers, processors, controllers, memories, communications units, and the like, and all network devices that can implement this application fall within the protection scope of this application.

Figure 12:
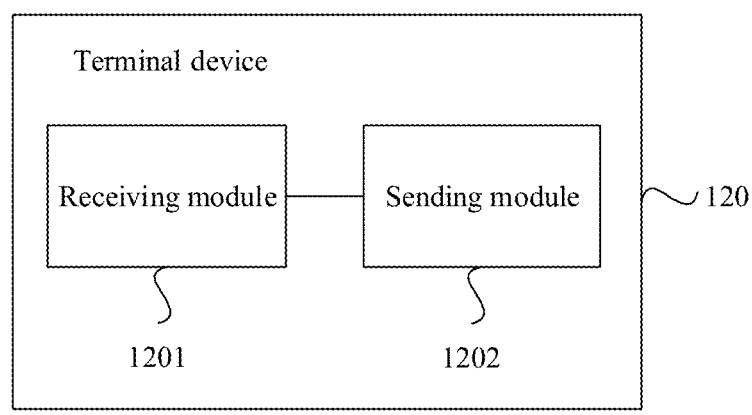
FIG. 12 is a schematic structural diagram of a terminal device according to an embodiment of this application.

FIG. 12 is a schematic structural diagram of a terminal device according to an embodiment of this application. As shown in FIG. 12, a terminal device 120 provided in this embodiment includes a receiving module 1201 and a sending module 1202.

The receiving module 1201 is configured to receive resource indication information sent by a network device, where the resource indication information is used to indicate location information of a resource in at least one bandwidth subset BWP in a system bandwidth and bandwidth information of the at least one BWP.

The sending module 1202 is configured to send uplink data to the network device on a resource corresponding to the resource indication information, where the resource is determined by the terminal device based on the resource indication information.

Optionally, the resource indication information includes a first resource indicator value and identification information of any BWP. The first RIV is used to indicate location information of a resource in the any BWP, and the identification information of the any BWP is used to indicate bandwidth information of the any BWP.

Optionally, the first RIV is determined by the network device based on a relative start resource block RB index of the resource in the any BWP and a quantity of interlaced resource block groups IRGs included in the resource.

Optionally, the resource indication information includes a second resource indicator value RIV. The second RIV is used to indicate the location information of the resource in the at least one BWP and the bandwidth information of the at least one BWP.

Optionally, the second RIV is determined by the network device based on a relative start resource block RB index, of a resource in each BWP, in the BWP, a quantity of interlaced resource block groups IRGs included in the resource in each BWP, and the bandwidth information of the at least one BWP.

Optionally, the bandwidth information of the at least one BWP includes identification information of the at least one BWP.

Optionally, the receiving module 1201 is specifically configured to:

receive resource indication information that is sent by the network device in a preset sequence and that corresponds to each BWP in the system bandwidth, where the resource indication information corresponding to each BWP is used to indicate location information of a resource in the BWP, a sending sequence of the resource indication information corresponding to each BWP corresponds to location information of the BWP in the system bandwidth, and the bandwidth information of the at least one BWP includes location information of the at least one BWP in the system bandwidth.

Optionally, the resource indication information corresponding to each BWP includes a third RIV corresponding to the BWP, and the third RIV corresponding to the BWP is determined by the network device based on a relative start resource block RB index, of the resource in the BWP, in the BWP and a quantity of interlaced resource block groups IRGs included in the resource in the BWP.

Optionally, if the network device does not allocate a resource to the terminal device in any BWP in the system bandwidth, resource indication information corresponding to the any BWP is preset resource indication information. The preset resource indication information is used to indicate that the resource allocated by the network device to the terminal device in the any BWP is empty.

Optionally, the resource indication information includes a combinatorial index value and quantity information of the at least one BWP. The combinatorial index value is used to indicate the location information of the resource in each BWP, and the quantity information of the at least one BWP is used to indicate the bandwidth information of the at least one BWP.

Optionally, the combinatorial index value is determined by the network device based on a start interlaced resource block group IRG index and an end IRG index, of the resource in each BWP, in the BWP and the quantity information of the at least one BWP.

The terminal device in this embodiment may be configured to execute the technical solutions provided in the foregoing corresponding data transmission method embodiment of this application. Implementation principles and technical effects thereof are similar. Details are not described herein again.

Figure 13:
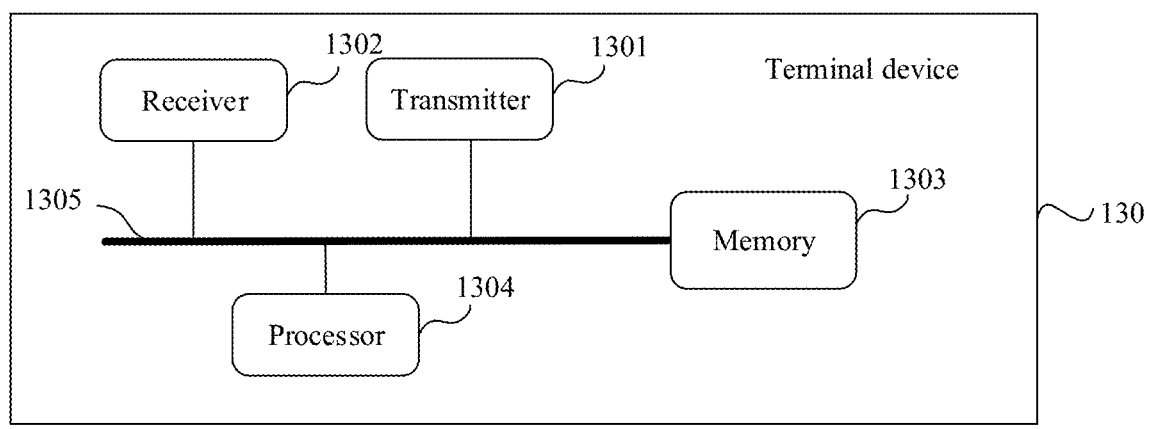
FIG. 13 is a schematic structural diagram of a terminal device according to another embodiment of this application.

FIG. 13 is a schematic structural diagram of a terminal device according to another embodiment of this application. As shown in FIG. 13, a terminal device 130 provided in this embodiment includes a transmitter 1301 and a receiver 1302. Optionally, the terminal device 130 may further include a memory 1303, a processor 1304, and at least one communications bus 1305.

The communications bus 1305 is configured to implement a communications connection between elements. The memory 1303 may include a high-speed RAM memory, or may include a nonvolatile memory NVM, for example, at least one magnetic disk memory. The memory 1303 may store various program instructions used to perform various processing functions and implement the method steps in the foregoing embodiments of this application. The processor 1304 is configured to invoke the program instruction in the memory 1303, to implement the method steps in the foregoing embodiments of this application by using the transmitter 1301 and/or the receiver 1302. The transmitter 1301 may be a corresponding output interface that has a communication function and an information sending function. The receiver 1302 may be a corresponding input interface that has a communication function and an information receiving function. Optionally, the transmitter 1301 and the receiver 1302 may be integrated into one communications interface, or may be two separate communications interfaces.

Optionally, the receiver 1302 is configured to receive resource indication information sent by a network device, where the resource indication information is used to indicate location information of a resource in at least one bandwidth subset BWP in a system bandwidth and bandwidth information of the at least one BWP.

The transmitter 1301 is configured to send uplink data to the network device on a resource corresponding to the resource indication information, where the resource is determined by the terminal device based on the resource indication information.

Optionally, the resource indication information includes a first resource indicator value and identification information of any BWP. The first RIV is used to indicate location information of a resource in the any BWP, and the identification information of the any BWP is used to indicate bandwidth information of the any BWP.

Optionally, the first RIV is determined by the network device based on a relative start resource block RB index of the resource in the any BWP and a quantity of interlaced resource block groups IRGs included in the resource.

Optionally, the resource indication information includes a second resource indicator value RIV. The second RIV is used to indicate the location information of the resource in the at least one BWP and the bandwidth information of the at least one BWP.

Optionally, the second RIV is determined by the network device based on a relative start resource block RB index, of a resource in each BWP, in the BWP, a quantity of interlaced resource block groups IRGs included in the resource in each BWP, and the bandwidth information of the at least one BWP.

Optionally, the bandwidth information of the at least one BWP includes identification information of the at least one BWP.

Optionally, the receiver 1302 is specifically configured to:

receive resource indication information that is sent by the network device in a preset sequence and that corresponds to each BWP in the system bandwidth, where the resource indication information corresponding to each BWP is used to indicate location information of a resource in the BWP, a sending sequence of the resource indication information corresponding to each BWP corresponds to location information of the BWP in the system bandwidth, and the bandwidth information of the at least one BWP includes location information of the at least one BWP in the system bandwidth.

Optionally, the resource indication information corresponding to each BWP includes a third RIV corresponding to the BWP, and the third RIV corresponding to the BWP is determined by the network device based on a relative start resource block RB index, of the resource in the BWP, in the BWP and a quantity of interlaced resource block groups IRGs included in the resource in the BWP.

Optionally, if the network device does not allocate a resource to the terminal device in any BWP in the system bandwidth, resource indication information corresponding to the any BWP is preset resource indication information. The preset resource indication information is used to indicate that the resource allocated by the network device to the terminal device in the any BWP is empty.

Optionally, the resource indication information includes a combinatorial index value and quantity information of the at least one BWP. The combinatorial index value is used to indicate the location information of the resource in each BWP, and the quantity information of the at least one BWP is used to indicate the bandwidth information of the at least one BWP.

Optionally, the combinatorial index value is determined by the network device based on a start interlaced resource block group IRG index and an end IRG index, of the resource in each BWP, in the BWP and the quantity information of the at least one BWP.

The terminal device in this embodiment may be configured to execute the technical solutions provided in the foregoing corresponding data transmission method embodiment of this application. Implementation principles and technical effects thereof are similar. Details are not described herein again.

It may be understood that, FIG. 13 merely shows a simplified design of the terminal device. In another implementation, the terminal device may include any quantity of transmitters, receivers, processors, controllers, memories, communications units, and the like, and all terminal devices that can implement this application fall within the protection scope of this application.

A network device provided in another embodiment of this application may include a sending module and a receiving module. Optionally, for a schematic structural diagram of the network device, refer to FIG. 10.

The sending module is configured to send resource indication information to a terminal device, where the resource indication information is used to indicate location information of two groups of inconsecutive resources on a system bandwidth.

The receiving module is configured to receive, on a resource corresponding to the resource indication information, uplink data sent by the terminal device.

Optionally, the resource indication information includes a combinatorial index value, and the combinatorial index value is determined by the network device based on a start interlaced resource block group IRG index and an end IRG index of each group of resources in the system bandwidth.

The network device in this embodiment may be configured to execute the technical solutions provided in the foregoing corresponding data transmission method embodiment of this application. Implementation principles and technical effects thereof are similar. Details are not described herein again.

A network device provided in another embodiment of this application may include a transmitter and a receiver. Optionally, the network device may further include a memory, a processor, and at least one communications bus. Optionally, for a schematic structural diagram of the network device, refer to FIG. 11.

The communications bus is configured to implement a communications connection between elements. The memory may include a high-speed RAM memory, or may include a nonvolatile memory NVM, for example, at least one magnetic disk memory. The memory may store various program instructions used to perform various processing functions and implement the method steps in the foregoing embodiments of this application. The processor is configured to invoke the program instruction in the memory, to implement the method steps in the foregoing embodiments of this application by using the transmitter and/or the receiver. The transmitter may be a corresponding output interface that has a communication function and an information sending function. The receiver may be a corresponding input interface that has a communication function and an information receiving function. Optionally, the transmitter and the receiver may be integrated into one communications interface, or may be two separate communications interfaces.

Optionally, the transmitter is configured to send resource indication information to a terminal device, where the resource indication information is used to indicate location information of two groups of inconsecutive resources on a system bandwidth.

The receiver is configured to receive, on a resource corresponding to the resource indication information, uplink data sent by the terminal device.

Optionally, the resource indication information includes a combinatorial index value, and the combinatorial index value is determined by the network device based on a start interlaced resource block group IRG index and an end IRG index of each group of resources in the system bandwidth.

The network device in this embodiment may be configured to execute the technical solutions provided in the foregoing corresponding data transmission method embodiment of this application. Implementation principles and technical effects thereof are similar. Details are not described herein again.

A terminal device provided in another embodiment of this application may include a receiving module and a sending module. Optionally, for a schematic structural diagram of the terminal device, refer to FIG. 12.

The receiving module is configured to receive resource indication information sent by a network device, where the resource indication information is used to indicate location information of two groups of inconsecutive resources on a system bandwidth.

The sending module is configured to send uplink data to the network device on a resource corresponding to the resource indication information, where the resource is determined by the terminal device based on the resource indication information.

Optionally, the resource indication information includes a combinatorial index value, and the combinatorial index value is determined by the network device based on a start interlaced resource block group IRG index and an end IRG index of each group of resources in the system bandwidth.

The terminal device in this embodiment may be configured to execute the technical solutions provided in the foregoing corresponding data transmission method embodiment of this application. Implementation principles and technical effects thereof are similar. Details are not described herein again.

A terminal device provided in another embodiment of this application may include a transmitter and a receiver. Optionally, the terminal device may further include a memory, a processor, and at least one communications bus. Optionally, for a schematic structural diagram of the terminal device, refer to FIG. 13.

The communications bus is configured to implement a communications connection between elements. The memory may include a high-speed RAM memory, or may include a nonvolatile memory NVM, for example, at least one magnetic disk memory. The memory may store various program instructions used to perform various processing functions and implement the method steps in the foregoing embodiments of this application. The processor is configured to invoke the program instruction in the memory, to implement the method steps in the foregoing embodiments of this application by using the transmitter and/or the receiver. The transmitter may be a corresponding output interface that has a communication function and an information sending function. The receiver may be a corresponding input interface that has a communication function and an information receiving function. Optionally, the transmitter and the receiver may be integrated into one communications interface, or may be two separate communications interfaces.

Optionally, the receiver is configured to receive resource indication information sent by a network device, where the resource indication information is used to indicate location information of two groups of inconsecutive resources on a system bandwidth.

The transmitter is configured to send uplink data to the network device on a resource corresponding to the resource indication information, where the resource is determined by the terminal device based on the resource indication information.

Optionally, the resource indication information includes a combinatorial index value, and the combinatorial index value is determined by the network device based on a start interlaced resource block group IRG index and an end IRG index of each group of resources in the system bandwidth.

The terminal device in this embodiment may be configured to execute the technical solutions provided in the foregoing corresponding data transmission method embodiment of this application. Implementation principles and technical effects thereof are similar. Details are not described herein again.

An embodiment of this application further provides a data transmission system, and the data transmission system includes a network device and at least one terminal device. The network device may use the structure in the foregoing network device embodiment, and correspondingly, may execute the technical solutions provided in the foregoing data transmission method embodiment. Correspondingly, the terminal device may use the structure in the foregoing terminal device embodiment, and correspondingly, may execute the technical solutions provided in the foregoing data transmission method embodiment. Specific implementation principles and technical effects thereof are similar. Details are not described herein again.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing apparatus, refer to a corresponding process in the foregoing method embodiments. Details are not described herein again.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid State Disk, SSD)), or the like.

The invention claimed is:

1. A terminal device, comprising:
a receiver, configured to receive resource indication information sent by a network device, wherein the resource indication information comprises a combinatorial index value and the combinatorial index value indicates a start interlaced resource block group index and a number of interlaced resource block groups; and
a transmitter, configured to send uplink data to the network device on a resource corresponding to the resource indication information, wherein the resource is determined by the terminal device based on the resource indication information.

2. The terminal device according to claim 1, wherein the resource indication information comprises quantity information of at least one bandwidth part (BWP), the combinatorial index value indicates location information of a resource in each BWP, and the quantity information of the at least one BWP indicates the bandwidth information of the at least one BWP.

3. A network device, comprising:
   a transmitter, configured to send resource indication information to a terminal device, wherein the resource indication information comprises a combinatorial index value and the combinatorial index value indicates a start interlaced resource block group index and a number of interlaced resource block groups; and
   a receiver, configured to receive, on a resource corresponding to the resource indication information, uplink data sent by the terminal device.

4. The network device according to claim 3, wherein the resource indication information comprises quantity information of at least one bandwidth part (BWP), the combinatorial index value is used to indicate location information of a resource in each BWP, and the quantity information of the at least one BWP is used to indicate the bandwidth information of the at least one BWP.

5. A data transmission method, comprising:
   receiving, by a terminal device, resource indication information sent by a network device, wherein the resource indication information comprises a combinatorial index value and the combinatorial index value indicates a start interlaced resource block group index and a number of interlaced resource block groups; and
   sending, by the terminal device, uplink data to the network device on a resource corresponding to the resource indication information, wherein the resource is determined by the terminal device based on the resource indication information.

6. The method according to claim 5, wherein the resource indication information comprises quantity information of at least one bandwidth part (BWP), the combinatorial index value indicates location information of a resource in each BWP, and the quantity information of the at least one BWP indicates the bandwidth information of the at least one BWP.

7. A data transmission method, comprising:
   sending, by a network device, resource indication information to a terminal device, wherein the resource indication information comprises a combinatorial index value and the combinatorial index value indicates a start interlaced resource block group index and a number of interlaced resource block groups; and
   receiving, by the network device, on a resource corresponding to the resource indication information, uplink data sent by the terminal device.

8. The method according to claim 7, wherein the resource indication information comprises quantity information of at least one bandwidth part (BWP), the combinatorial index value indicates location information of a resource in each BWP, and the quantity information of the at least one BWP indicates the bandwidth information of the at least one BWP.

* * * * *